United States Patent
Delefevre

(10) Patent No.: US 7,574,427 B2
(45) Date of Patent: Aug. 11, 2009

(54) NEUTRAL SALES CONSULTANT

(76) Inventor: Patrick Y. Delefevre, 190 Mt. Auburn St., Apt. 2-2, Watertown, MA (US) 02172

( * ) Notice: Subject to any disclaimer, the term of this patent is extended or adjusted under 35 U.S.C. 154(b) by 278 days.

(21) Appl. No.: 11/144,432

(22) Filed: Jun. 3, 2005

(65) Prior Publication Data

US 2007/0011131 A1  Jan. 11, 2007

Related U.S. Application Data

(63) Continuation-in-part of application No. 10/784,420, filed on Feb. 23, 2004, and a continuation-in-part of application No. 10/150,256, filed on May 17, 2002, now abandoned.

(60) Provisional application No. 60/631,478, filed on Nov. 29, 2004, provisional application No. 60/631,498, filed on Nov. 29, 2004.

(51) Int. Cl.
*G06F 17/30* (2006.01)
*G06F 15/16* (2006.01)

(52) U.S. Cl. ............... 707/3; 707/4; 707/5; 707/6; 707/104.1; 709/217; 709/225; 709/229; 382/116; 382/124; 382/305

(58) Field of Classification Search ............... 707/3, 707/4, 5, 6, 104.1; 709/224, 217, 225, 226, 709/229; 382/116, 124, 305
See application file for complete search history.

(56) References Cited

U.S. PATENT DOCUMENTS

| | | | | |
|---|---|---|---|---|
| 5,442,780 A | * | 8/1995 | Takanashi et al. | 707/1 |
| 5,884,302 A | * | 3/1999 | Ho | 707/3 |
| 5,895,466 A | * | 4/1999 | Goldberg et al. | 707/5 |
| 5,995,921 A | * | 11/1999 | Richards et al. | 704/9 |
| 6,173,279 B1 | * | 1/2001 | Levin et al. | 707/5 |
| 6,393,417 B1 | * | 5/2002 | De Le fevre | 707/6 |
| 6,981,040 B1 | * | 12/2005 | Konig et al. | 709/224 |
| 7,110,994 B1 | * | 9/2006 | Herdman | 707/3 |
| 2003/0041058 A1 | * | 2/2003 | Ibuki et al. | 707/4 |

* cited by examiner

*Primary Examiner*—Tony Mahmoudi
*Assistant Examiner*—Dennis Truong
(74) *Attorney, Agent, or Firm*—Robert K. Tendler

(57) ABSTRACT

An expert system is provided for answering questions provided by a potential purchaser of goods or services using a neutral sales consultant in which a question sentence entered by the purchaser is understood using specialized library tables developed to understand both the subject and form of the question sentence. Thereafter an appropriate or relevant answer to the question is automatically given relating to sale of the product or service. The result is that questions are more easily understood by the system and more relevant answers can be given because both relate to specialized fingerprint parameters and the use of neutral experts.

14 Claims, 38 Drawing Sheets

[LEGEND]

EQP: Electronic Query Print

NSC: Neutral Sales Consultant

GLT: General Library Tables

GLQF: General Library of Question forms

EEL for Q+O: English Experts Library for question forms and other words to complete question forms.

Q: Question forms

O: Other words & symbols to complete question form

Q+O: Question forms + Other words & symbols
      to complete question forms

S: Subject question

P: Parameters

VT: Variable Tables, sub-division of parameters

It: Items, sub-division of variable tables

Unit: a unit can be a parameter, a variable table or an item.

Fig.2

NEUTRAL SALES CONSULTANT

RELATED APPLICATIONS

This Application is a continuation in part of U.S. application Ser. No. 10/150,256 filed May 17,2002 now abandoned, and U.S. application Ser. No. 10/784,420 filed Feb. 23, 2004, the contents of which are incorporated herein by reference. This Application also claims rights under 35 USC § 119(e) from U.S. Provisional Application 60/631,478 filed Nov. 29, 2004, and U.S. Provisional Application 60/631,498 filed Nov. 29, 2004, the contents of which are incorporated herein by reference.

FIELD OF THE INVENTION

This invention relates to a fingerprint query search engine and more particularly to a neutral sales consultant for a search engine that relies upon fingerprint parameters.

BACKGROUND OF THE INVENTION

As described in U.S. Pat. No. 6,393,417 filed Oct. 15, 1999, incorporated herein by reference, at Internet search system is described which uses a so-called fingerprint to home in on a result, with the fingerprint in one embodiment being matched to the fingerprints of merchants called entrants. The fingerprint is generated using parameters selected by users for their fingerprints and provides a highly targeted search.

However, in using an Internet search, it is typical for a user to have questions about a product, not necessarily specific questions, but any question that might be interesting to the user regarding the product or service he is about to buy. This information that the user would like to have should come from a person who is not engaged in selling, so that a user can make his decisions based on information from an impartial source.

Thus, the individual giving the advice should not be involved selling when he gives information about a product. It should be a person who works for the user, a consumer, and it should be a person who is able to give balanced information so that the consumer, the user, will be able to make an informed choice. Such information should come from a consultant, preferably a Neutral Sales Consultant.

Presently one can ask a question to any person on the Internet and certain search engines permit questions and answers. The Google search engine has two ways for answering questions. One is for the user to enter a search word or question in a search box, which can be any question. However, this technique is not designed to answer questions but is designed to find sites or resources that match the specific words. Secondly, the Google search engine provides another service that accesses 500-600 experts or professionals in various fields. The user can ask a question and a person will answer him on-line. This method does not invoke an algorithm or any automatic agent.

The above system, first of all, involves a human being and is thus not automated. Secondly, getting an answer from a human being may take 24 hours or more. Thirdly, the expert can indirectly influence the choice of the user.

What is required is an artificial intelligence system, to be behind the screen, to find out what is meant by a question; i.e., a user-centric question that is to be answered and to provide an unbiased relevant answer. Moreover, the answers need to be from experts in the field of inquiry and need to be generated in a way that lets the user benefit from unbiased, already categorized answers.

SUMMARY OF INVENTION

The subject system is meant to work with the parameters characteristic of a user-generated fingerprint and to provide the user with useful information related to his or her question.

In order to access the system to invoke a response from a Neutral Sales Consultant, in the usual scenario a user has a query about some subject and forms a sentence. The sentence is in the form of a question and has a subject, together with other words that complete the question sentence.

It is the purpose of the Neutral Sales Consultant to read the question sentence by passing it through a library of subjects so as to be able to define the subject of the question sentence.

The library of subjects is formulated in a specialized way using the techniques involved in generating fingerprints or electronic query prints. In one embodiment, this involves seven or more specialized parameters. It is part of the subject invention that these parameters have been found to encompass the unique set of concerns of a user who wants to purchase an item or service. From the aforementioned patent the primary parameters are as follows:

TABLE I

Description
Location
Price
Customer and Consultant Services
Payment Agreement
Shipment and Time
Insurance/Warranties
Maintenance
Others The system has two distinct features. The first is the unique setup of its tables and libraries and the second is its unique runtime operation.

Setup

It is noted that the subject system relies on the setup of Library Tables that contain all of the possible categories, subjects, types of questions, answers and refinements. One of the Library Tables is called the General Library Table and contains all of the possible subjects that one could ask for a particular category. Such a General Library Table is of course quite large and in order for the efficient query to be mounted, the tables within the General Library Table are filtered so that only a portion of the General Library Table need be queried at any given time. Since the General Library Table's organization is primarily centered upon fingerprint parameters, the setup of the General Library Table first is populated taking into account the fingerprint parameters.

Having provided a relatively large database comprising the General Library Table, as a filtration during setup one forms a subset of all of the lists involved in making up the General Library Tables. In one embodiment only four lists of all of the possible lists are selected and the selected lists therefore comprise what is called the Selected General Library Table. The lists that are selected are four in number, namely words, their synonyms, symbols and jargon.

However, having refined the General Library Tables by virtue of creating the Selected General Library Tables, this does not provide the greatest efficiency. The Selected General Library Tables are further refined by the knowledge provided by experts in which the experts for any given category provide a table of realistic relations between items that can be found in the Selected General Library Tables. It is a feature of the subject invention that one cannot interrogate a database efficiently without screening the words or items to allow only those that make sense in terms of a relationship. Those that make sense are determined during setup by a panel of experts.

Having thus provided the General Library Table to be one that makes sense to experts, one then has a specialized General Library Table which can be rapidly accessed by the user's question.

It is important to set up the Neutral Sales Consultant system using the specialized parameters formulated for fingerprint queries because it makes the question more easily understood by the system. This is due to the fact that the set of specialized parameters is specifically adapted to the purchasing of items or a service. Thus a general corpus is not required to power the Neutral Sales Consultant.

More particularly, to facilitate question answering, the library employed by the Neutral Sales Consultant is set up to use seven or more of the above specialized parameters unique to the purchasing of items. These parameters are further subdivided into items or parts of subjects.

It is important to able to set up the system so that it can recognize subjects that are compositions of words (items) and the type of question asked; and then give pre-defined answers. In giving the answers, the system uses the same logic for creating a fingerprint that is described in U.S. Pat. No. 6,393,417. This means that one first starts by setting up the ability to read a sentence using fingerprint parameters. This is accomplished by setting up a library of words in different lists that can compose a subject for any question related to a specific category. These words (items) are used to populate a library by taking the predetermined parameters, variable tables and items for each category of inquiry, with these lists used to generate the General Library Tables.

In so doing, the fingerprint scheme of U.S. Pat. No. 6,393,417 is applied in the generation of the General Library Tables.

The result of having done so is to provide a set of General Library Tables that reflect all possible items related to a category.

As can be seen in the generation of the General Library Tables, the General Library Tables are organized in lists. By virtue of populating the General Library Tables, all of the possible items related to a category are populated into the library.

As noted above, providing a library of all possible items related to a category is much too large, and in the subject invention four lists are selected, namely a list containing words that are related to a category according to the defined parameters, variable tables of items, a list of containing their synonyms, a list of symbols that can be used in a question sentence, and a list of all jargon related to items, variable tables, and parameters of a specific category. This provides a Selected General Library Table that creates a filtration because one does not want to use all possible words to define subjects for questions relating to a category.

Note that the Selected General Library Table is formed from the specialized parameters, variable tables and items that are part of the General Library Table.

A relationship matrix is then formed that involves all words that constitute parameters, variable table entries, and items from the Selected General Library Table. The relationship matrix defines the relationship between two units (parameters, variable table entries or items).

The reason that a relationship matrix is formed is for two reasons: first, because most questions have more than one unit in a subject; and second, so as to be able to present an expert with a number of relationship matrices as a basket of relations for a given category. These baskets are submitted to experts in the field so that the experts can ascertain which of the relations are actual relations or have a strong relationship and which are not very related, if at all. Those items, variable tables and parameters that exist for expert verified relationships are then populated in a library called the Expert General Library Table.

By virtue of the experts deciding from the relation matrices what relations exist in real situations, then for each such relation, experts determine what questions can be asked about the specific relation.

Experts are then called upon to decide from the questions that can be asked about a specific relation that makes sense, what the most likely questions are that relate to the particular subject as defined by its relations and then what the corresponding answers should be.

Having set up the tables in this manner, one places the most likely questions and the corresponding answers into a system library called the List of Experts' Questions and the List of Experts' Answers.

Additionally, having arrived at a List of Experts' Questions and Answers, one passes this list through an English expert function to generate ways a given question can be asked and still obtain the same answer. Thus, having decided the ways a particular question can be asked, one stores the ways that this question can be asked in a library called the English Expert Library.

Another library is also set up to recognize from all possible words or symbols that complete a question what the question form is. Thus this library contains question forms or other words that complete a question form. That library is called General Library of All Question Forms.

The result is that one has established an engine that can be interrogated with a user's question in order to obtain a reliable, sensible answer.

Runtime

The second part of the system revolves around how a query is handled by the system. A user first inputs a question sentence which is composed of number of words (units) that interrogates the Expert's General Library Table set up to recognize certain parameters, tables and items from the four lists selected. If in the query units are found, the units become part of the subject. Then the remaining units of the question sentence interrogate the Selected General Library Table to determine if there are more units that are subjects to be added.

Having found a subject, the question is submitted to the General Library of All Question Forms utilizing the remaining items of the subject's sentence. This permits recognizing some of the question, i.e., its question form.

If the remaining units result in the finding of a legitimate question form from the General Library of Question Forms, one has defined a legitimate question and one has a subject.

One then proceeds to the List of Experts' Questions and the system gives a corresponding answer from the List of Experts' Answers.

On the other hand, if at this time no corresponding question form is found, the system gives the user all of the questions that relate to an already-defined subject, with the user selecting which question he would like to ask. This then results in the system giving the corresponding answer back to the user.

Note the formation of libraries and runtime operation depend not only on specialized parameters but also on expert input, with the expert being neutral as discussed above.

Thus, in the subject invention, the system starts with both a General Library Table and a General Library of Question Forms. Then a specialized algorithm is provided that understands the question and picks the answers from experts who have experience in answering the type of question posed.

The expert system is comprised of experts who do not work for companies offering products. They are not empowered to answer questions as to which product is better, but rather are authorized to give facts on the merit of a question.

In summary, an expert system is provided for answering questions from a potential purchaser of goods or services using a neutral sales consultant in which the question is understood using specialized parameters developed for fingerprint queries, with both the query formed and the question answered given utilizing specialized fingerprint parameters relating to sale of products or services. The result is that questions are more easily understood by the system and more relevant answers can be given because both relate to the specialized fingerprint parameters and neutral experts.

BRIEF DESCRIPTION OF THE DRAWINGS

These and other features of the subject invention will be better understood in connection with a Detailed Description, in conjunction with the Drawings, of which:

FIG. 2 is a chart of the legends used in the description of the subject invention;

DETAILED DESCRIPTION

Figure 1A:
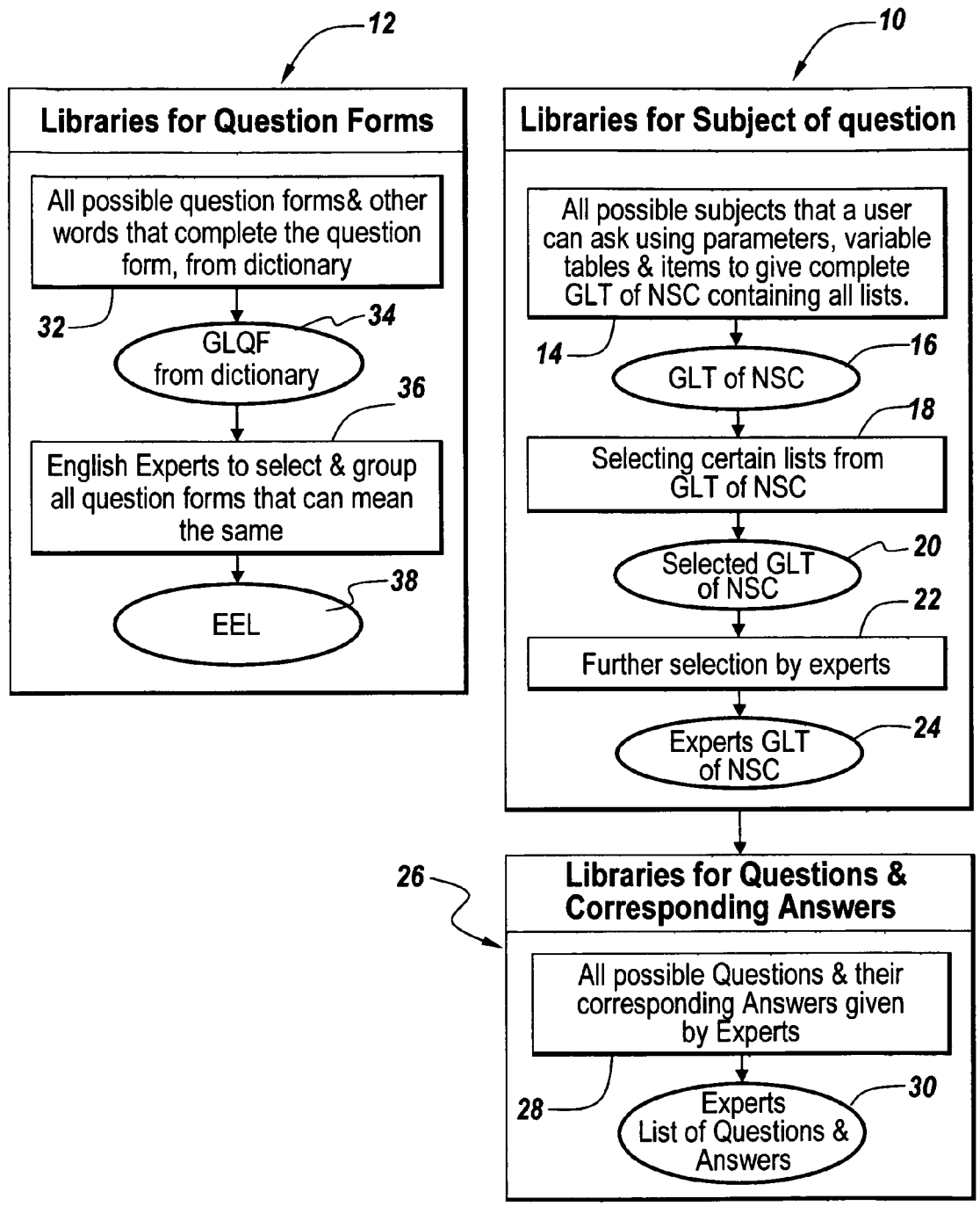
FIG. 1A is a diagrammatic representation of the Neutral Sales Consultant system in setup mode to describe the creation of a library to recognize subjects of a question and a second library to determine if the question has an acceptable form.

Prior to discussing the subject system in detail, the following scenario is presented.

As an example, a user might want to know difference between polyester and down in upholstery. The question sentence might be, for instance, "What is the difference between polyester and down in upholstery?" Or the user may want to know what makes a particular item function for some purpose. For instance, the weight may be of interest. So instead of a real life salesman answering the query, in the subject system there is a numerical way of defining answers and questions. The subject system recognizes that there is a person who is asking the question and gives him appropriate answers to his question. Of course, staying neutral is important because the expert is constrained to give answers based on the merits of the question, not on the merit of the product of a particular company.

There have been expert systems in the past. The difference in the present artificial intelligence system is that it depends on the parameters of the fingerprint system described in the above patent. The fingerprint is a way of organizing a query and mimics how the human brain works to generate a question about a product or service. The fingerprint parameters are thus useful in recognizing the question so a responsive answer can be given. The fingerprint parameters in essence guide the question through both the General Library Table and the General Library of Question Forms.

The General Library Table contains items, variable tables and parameters based on specialized parameters that relate to the way the tables are organized in terms of the initial fingerprint, permitting the subject system to understand the question and give a responsive answer.

Setup

First, one has to create a General Library Table and General Library of Question Forms. Note the General Library Table is provided with an organization to understand the question and precisely answer questions. Because of the particular organization, the system performs a filtration function or sieve that can process the large amount of information stored in the General Library Table and General Library of Question Forms. The result is that any relevant question can be quickly recognized. The General Library Table and General Library of Question Forms together store everything necessary for the Neutral Sales Consultant to function. Note in the setup, the particular parameters used are those in a fingerprint set designed to be used by a user to find a product or service. For instance, if one is going to ask a question about furniture, the system must be set up with parameters that any person must ask about a product or service, and with forms indicating the origin of the question, i.e., where does the question spring from?

The questions are thus generated from parameter; description; price, payment, maintenance, insurance; i.e., the basic parameters.

Therefore, all questions that concern a product must come from the specialized parameters associated with fingerprint queries.

The system in one embodiment is set up so that it can analyze the status of the product. Is it a rental? Is it new? Is it an antique? et cetera. The system also understands other variables set up as entries in variable tables, such as color, form, shape, and dimension. The result is a large number of variable tables with a large number of entries. If these attributes are involved the setup of the General Library Table is subdivided into items such as in case of color e.g., white, black or grey. One could also, for instance, be interested in hazards, hygiene or wear.

Due to the subdivision of the specialized fingerprint parameters, the system knows that any word of the subject of the question asked must come from the specialized parameters as filtered by the subdivisions. When the subject system subsequently invokes an expert, he answers the questions that are directly related to the specialized parameters subdivided as appropriate.

The difference in the subject expert system is that it is organized around the specialized fingerprint parameters related to the purchase of an item or service.

Upon query recognition, the subject system invokes an expert, asking him to give an answer related to the numbers and thus the associated parameters.

For instance, one can ask about polyester or down the following questions: what is the difference? Given the parameters, the expert can give an answer. So for each fingerprint parameter related to a question about some category of product or service one obtains relevant answers.

As a result, in the subject system, a library is generated that contains all possible question forms that human being can ask. Note, the form used in the question must be found in order to generate an answer. The Expert General Library Table to be described will not respond to all possible relations in the words or items of a question, especially where there is no necessary relation.

Take, for example, "culture" and "down." Maybe there is no relation between "culture" and "down." These terms are thus out of the circle of answerable questions as defined by the expert. Thus the expert would say, from all possibilities, this is where the public is most likely going to ask a question. Note, the expert's opinion is in the form of a mathematical factorial and not all mathematical factorials point to a valid question in the market.

As to the experts, one can limit the number of experts required so that one does not have to hire an expert for every possible category or every possible product. This would require hundreds and millions of experts. The number of experts is limited by the number of parameters that one is willing to accommodate. If one wants to know about blue elephants of Tunisia, one does not get an answer because there is no expert for blue elephants of Tunisia. This is because neither blue elephants nor Tunisia are part of the fingerprint parameters.

Thus the subject system can enlist the services of a limited number of experts based on the specialized parameters that the system uses. This makes the expert system manageable.

As to the parameters that are involved in an initial fingerprint query, the parameters are naturally related because that is the way they were originally set up.

For instance, many users are concerned about the environment, sometimes called "green" issues. The resolution of green issues oftentimes requires a neutral expert. Because the fingerprint originally generated contains a green issue parameter, one has a factorial for the neutral sales consultant expert that is related to green issues. Thus the original fingerprint and the parameters used by the neutral sales consultant go hand-in-hand.

Runtime

The mechanics used in processing a question to get an answer from a Neutral Sales Consultant are based on the following. First, a question is picked and entered either by selection or by typing. This may be any question, which is then fragmented into a number of parts, e.g., words, herein referred to as units.

People do not usually fragment questions in the above manner. However, the subject system fragments a query in this sense. The question is in the form of words (or units), i.e., composites, that form the question.

The system then takes all the units and interrogates the Expert's General Library Table. Units found in any parameter, variable table or item in the Expert's General Library Table constitute part of the subject. Then the remaining units not found are used to interrogate the Selected General Library Table to determine which units can also be related to a subject.

For example, if a unit that does not match any item of the Expert General Library Table is found or matched in the Selected General Library Table, then the matched items' corresponding variable table might be a part of the subject. As a result, the matched items' corresponding variable table word is sent to the Expert General Library Table. If a match of this variable table word is found, then the subject is composed. Note, if the variable table word belongs to a description parameter, then there will be always a subject where an expert answer will exist. If the variable table word is not found, then for the variable table word, the system automatically takes its corresponding parameter to complete the subject. Note that there will always be answers from experts to any subject containing a word that constitutes a parameter. For instance, if the system did not 100% recognize an item or variable table containing the price parameter, then the system automatically takes the price as part of the subject.

Note if on the other hand a unit is matched to entries in a variable table in the Selected General Library then the variable tables' corresponding parameters will be part of the subject. This being the case, predetermined answers will exist in the Expert's List of Questions and Answers because all parameters of the subject system have a designated question and answer.

After this process the subject of the question sentence is defined. If on the other hand nothing is outputted either from the Expert General Library Table or from the Selected General Library Table, then it means that one is not talking about anything that can be answered and the system will not take the question. For example, if the system wants to recognize the subject of the question sentence, "What is the difference between polyester and down in upholstery?", the system recognizes the subject by entering the question sentence first into the Expert General Library Table. The subject is recognized by the words (items) polyester, down, upholstery, which are found or matched to certain parameters, entries in variable tables or items in the Expert General Library Table created during setup.

The system then examines the other section of the question by entering the query or the remaining words (units) of the question sentence into the General Library of Question Forms, which is the library of all question forms. This is because a human being cannot provide all possible answers to a general inquiry or question without considering the form of the sentence expressing the query.

If the question form is not found in General Library of Question Forms then the system takes all the remaining units and interrogates the General Library Table. If these remaining units are not found in the General Library Table, then the system ignores them. However, if these remaining units are found in the General Library Table, the system uses them for manual identification and indexing. This is done to upgrade all the system's libraries. If on the other hand units are found in the General Library of Question Forms, then it means the question form makes sense. The system then passes the question units to the Expert List of All Questions related to a particular subject for a match. If the question form units do not match from the Expert List of Questions related to a particular subject, then these units interrogate the English Expert Library, EEL, to ascertain if there is a match. If found, the system has understood the user's question form. Since the subject system has already understood the subject, all the issues about the question sentence are determined. Accordingly, the system will provide the corresponding answer for that question sentence through the Expert Library of Questions and Answers.

If the question form is not found, the subject system will give the user all possible questions related to the subject, and the user may select from the possible questions the question to be answered.

Note that it may be impossible to filter a question properly. This means the question cannot be answered 100% precisely every time. Thus, if the subject system after interrogating the General Library Table cannot give a 100% precise answer, the system provides a mechanism to make the answer less precise.

Because of the use of the specialized parameters there can be an exact understanding of what the question is and what the answer is. In order to do this, the user's question requires a considerable amount of filtration. So if, for example, the user asks a question and the system does not have a precise answer for it, the system will nonetheless give an answer concerning the same thing but from a higher level variable table.

As a result, the subject system will always give an answer to a question but at a different, higher level. This is to satisfy the user when he is asking a question that does not have a precise answer. Even if there is no precise answer, the system nonetheless provides an answer by using the parameters and variable tables relevant to a less precise higher-level inquiry.

Another possibility for a user to enter a question sentence is by selection instead of typing. If that is more convenient, the user selects units (either single or double) or words from the Selected General Library Table as parameters, variable table entries or items. By so doing the user has selected valid relations if these relations are found in the Expert List of Subjects which is an extract from the Experts Library of Questions and Answers. If found in the Expert Lists of Subjects, then the user is given all possible questions selected from the General Library of Question Forms and the English Expert Library. Thereafter the user is given the corresponding answers from the Expert List of Questions and Answers.

Referring now to the figures, the basic neutral sales consultant is described in the following broad outline:

Referring now to FIG. 1A, in order for the Neutral Sales Consultant to be properly set up, one needs to establish a set of libraries according to each category of product or service. The first, as illustrated by reference character 10, is a set of libraries having to do with the subject portion of a query, which is used by the system to determine from the question the subject about which the question is centered.

It is not enough to simply determine the subject matter of a question. One must also make sure that the sentence that is entered containing the question is of an acceptable form. In order to do so, the system is required to be set up with a library 12 of question forms so that the sentence entered can be verified as being in a form that relates to a question that can be answered.

In order to set up the library for the subjects of a question, one first needs to ascertain all possible subjects that a user can ask and do so using the aforementioned parameters and additional variable tables and items to be able to create a complete General Library Table containing all lists. This setup procedure is shown by reference character 14 and results in the General Library Table 16 of the Neutral Sales Consultant system.

Thereafter, as illustrated at 18, the setup of the General Library Table, since it is made up of certain lists, requires a narrowing down or selection from the lists such that only certain of the total number of lists are selected.

The result, as shown at 20, is the Selected General Library Table. Then, as shown at 22, the Selected General Library Table is further refined by experts in the various fields, with the result being an Expert's General Library Table as shown at 24.

The Expert's General Library Table is then coupled to a process 26 that constitutes libraries for the questions to be asked and the corresponding answers, which itself includes all possible questions and corresponding answers to be given by experts as illustrated at 28. The net result is an Expert's List of Questions and Answers as illustrated at 30.

Having described at least the subject of the question that has been asked, one also has to understand the input question sentence to make sure that it is a form that is answerable in a meaningful way. One therefore has to set up a list of question forms as illustrated at 32 which, as illustrated, includes setting up all possible question forms and other words that complete the question form to provide a General Library of Question Forms 34. This General Library of Question Forms is derived from a dictionary of words that form questions.

Having a General Library of Question Forms, during the setup procedure one couples all such question forms to an English Experts process 36 to select and group all question forms that can mean the same thing.

What this means is that if the same question can be asked a number of different ways and yet result in the same answer, then all of these forms of questions need to be identified as being acceptable question forms. The conglomerate of all of the question forms is now stored in an English Experts Library, EEL 38.

As will be seen during runtime, a question that has been input in terms of a sentence to the Neutral Sales Consultant system must pass the test of being in an appropriate question format.

Simultaneously, the input sentence must pass the test of the subject library so that the subject matter, filtered or refined by experts, can be ascertained. Thus the input sentence during runtime is to be inputted to libraries of questions for which corresponding answers can be given, namely to access the Expert's List of Questions and Answers.

Figure 1B:
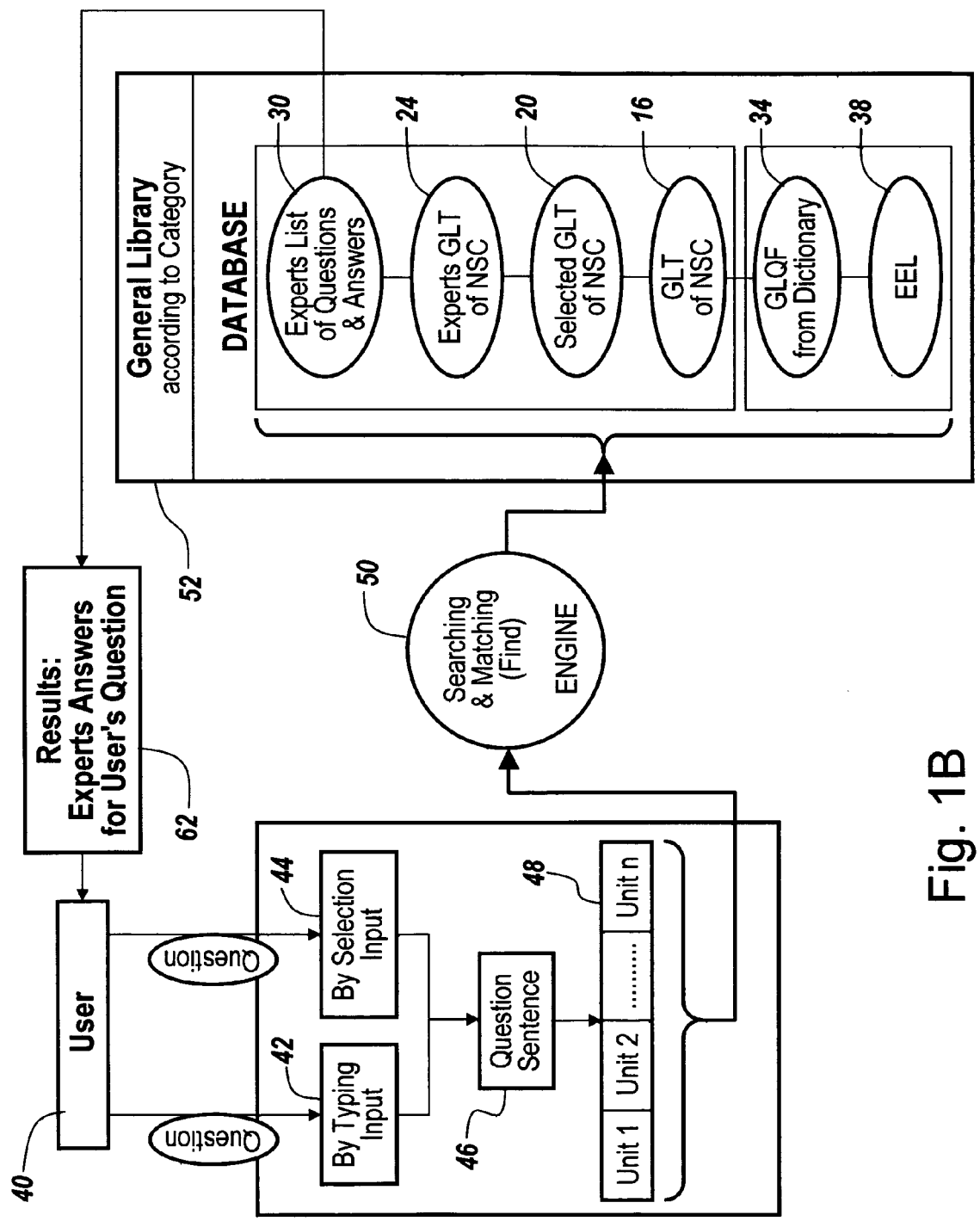
FIG. 1B is a diagrammatic representation of the runtime portion of the subject system indicating an input sentence and a search engine to determine the subject of the question and to provide a neutral expert's answer.

Referring now to FIG. 1B, during runtime a user 40 can input his or her question either by typing an input as illustrated at 42 or by selecting an input from on-screen icons as illustrated at 44, the net result of which is a question sentence 46.

The question sent is then broken up as illustrated at 48 into a number of units, e.g., words. The units are first inputted to the Expert's General Library Table 24 to determine if there is a match between the units and the items in the Expert's General Library Table. The matched units define part of the subject, with other units left over. All remaining units are input to the Selected General Library Table 20 to further define the subject. Having defined the subject, the remaining units are input to the General Library of Question Forms 34. If there is a valid question ascertained, the subject and the question form are returned to the Experts List of Questions and Answers 30.

The remaining items not found in the Expert's General Library Table or the Selected General Library Table, or even in the General Library of Question Forms are input to the General Library Table 16 for manual indexing. By manual indexing is meant manually upgrading all of the library tables for new items such that the library tables become more efficient. Note that the manual updating is performed if the particular units are found. If the particular units are not found in the General Library Table, they are ignored.

Once having ascertained that there is an appropriate question and the subject matter of the question, the system accesses the Experts List of Questions and Answers 30, which then outputs the appropriate answer as a result as illustrated at 62 to user 40.

If, however, the subject found and the question form found at 34 do not match an exact question by the expert, the English Expert Library 38 is accessed to see if there is a similar question that would have the same result. If so, that question is then input to the Experts List of Questions and Answers 30, and should there be an exact match, then the appropriate answer is outputted. If not, all of the questions are provided to the user for his particular subject. Thus the system gives all of the questions that are related to that subject and the user may select from these questions that are to be answered.

In summary, first a user asks a question by either typing or by selection from a list. That question query is fragmented, decomposed into words or units to be determined by the system as subjects (S) or question forms (Q) or other words that complete the question forms (O).

The system takes this question sentence and passes it through the searching and matching engine 50. In the above example, the subject would be polyester, upholstery, fire, green, or whatever the question is about, i.e., the subject of that question.

The system them specifies the subjects of the question by entering it into a General Library or database that contains a General Library Table 52.

This is the same General Library Table that was created using the user's parameters and variable tables. Note that during setup all of the parameters in the Expert's General Library Table 24 were refined or subdivided using variable tables, subdivided into items, like description, parameter, price, payment, i.e., all the parameters related to the product sought. Then during setup each parameter was subdivided, for example, into the function, user, dimension, color, fire, weather, culture, comfort, hygiene, green, etc. These are called Variable Tables. Each Variable Table for a parameter is then further subdivided into items. For example, the color variable table is divided into light colors, dark colors, warm colors, blue colors, green, dark green, yellow, violet, all of which are items. This is because the subject is going to be one of those colors if it belongs in that table. Note there are further lists in the General Library Table 16 such as synonyms.

Next the system during setup selects from lists that constitute the Selected General Library Table 20.

Next an expert addresses the same questions that might come up from all these parameters and the expert then does a relational analysis. For instance, one cannot have the relation of color to culture. This is too distant a relation. So the expert decides which relations exist. Next a factorial matrix is made from the Selected General Library Table to define relations between items in the Selected General Library Table 20. These relations are then given to experts.

This expert handles only the items, variable tables and parameters for the particular question that have relationships, i.e., only questions that have relationships that the particular expert is capable of handling.

Thus the General Library Table 16 contains all the possible questions related to a particular parameter and associated variable tables. Note that some questions are too far-fetched as far as a relation is concerned. These are filtered out by the expert. The expert thus filters out unreasonable questions.

Then during setup the expert determines what the acceptable relations are. Thus, if the question relates to "down" and "polyester," the expert can define how many forms of questions one can ask about that relation. In short, for a correct relation, the expert can specify the questions arising from valid relations that are put in a certain library. The expert then gives answers based on those relations from a library of those questions. This constitutes a database of those questions that form the Experts List of Questions and Answers 30.

More particularly, in setting up, after having created libraries to ascertain the subject, the system is then set up to categorize the question sentence as to question form (Q) and any other words that complete the question form (O). This question forms library covers all possible question and question forms that a human being can ask.

So any person who wants a question answered must pass a test if his question is to be answered by an expert. As a result, an expert only answers a question if the question has an authorized form from a library of all possible question forms. Thus any human being that asks a question must have the question pulled from the question forms.

By way of example, to illustrate how the setup of the system provides efficiency, if a user wants to ask a question about "polyester" and "down" upholstery, instead of entering these words into a traditional search engine that might net 20,000 or 100,000 answers, most having nothing to do with furniture, using the subject system with its question form filter and the subject filters provides expert answers that are limited in number and targeted to the question.

Referring now to FIG. 2, a legend is set out which will aid in the understanding of the subject invention. Note the Neutral Sales Consultant system is described as having general library tables constituting the General Library Table; a general library of question forms, namely the General Library of Question Forms, GLDF; an English Experts Library for (Q+O), the EEL; the question forms, Q; other words and symbols to complete the question forms, O; Q plus O or the question forms plus other words to complete the question forms; S, the subject question; P, the parameters; VT, the variable tables; and IT, the items. A unit can be comprised of parameters, P, variable tables, VT, or items, IT.

Figure 3:
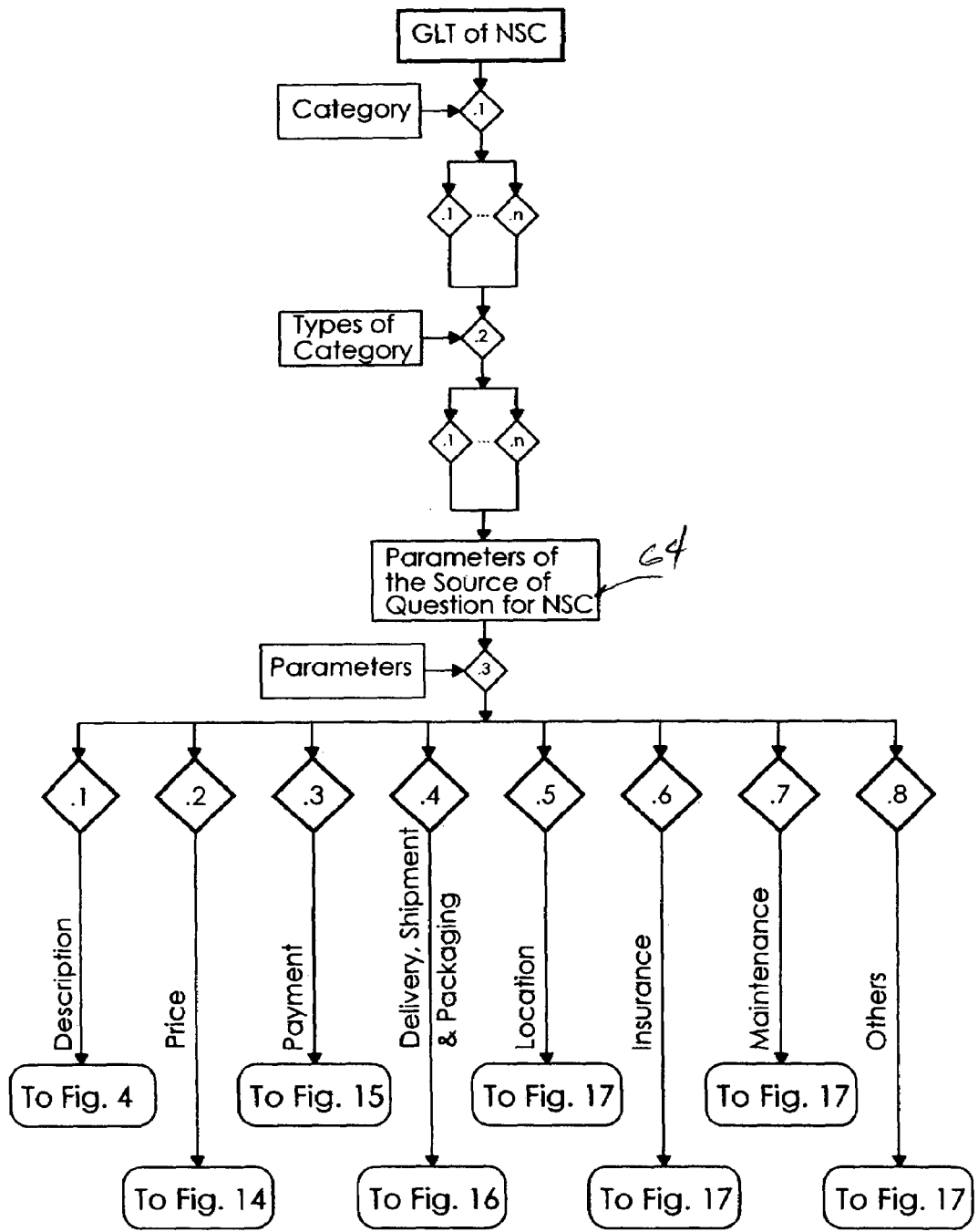
FIG. 3 is a flow chart representing the setup of the General Library Table used by the Neutral Sales Consultant system in understanding the user's question, showing all parameters upon which the Neutral Sales Consultant system operates.

Referring to FIG. 3, the first step in the setup is to enumerate all categories. Categories can include, for instance, whether the subject of a question is "home" or "garden." And then having, for instance, chosen the home/garden category, the system is set up to further categorize in terms of the type of category, such as "furniture." The parameters for home/garden, furniture are then further categorized using fingerprint parameters. Moreover, the parameters are expanded to include items or units that relate to the source of a question as illustrated at 64. The library tables have to be set to include every aspect of a category and in order to do this one adds units or items to the existing parameters. This will be shown in connection with FIGS. 4, 14, 15, 16 and 17 described hereinafter and complete the population of the libraries.

Figure 4:
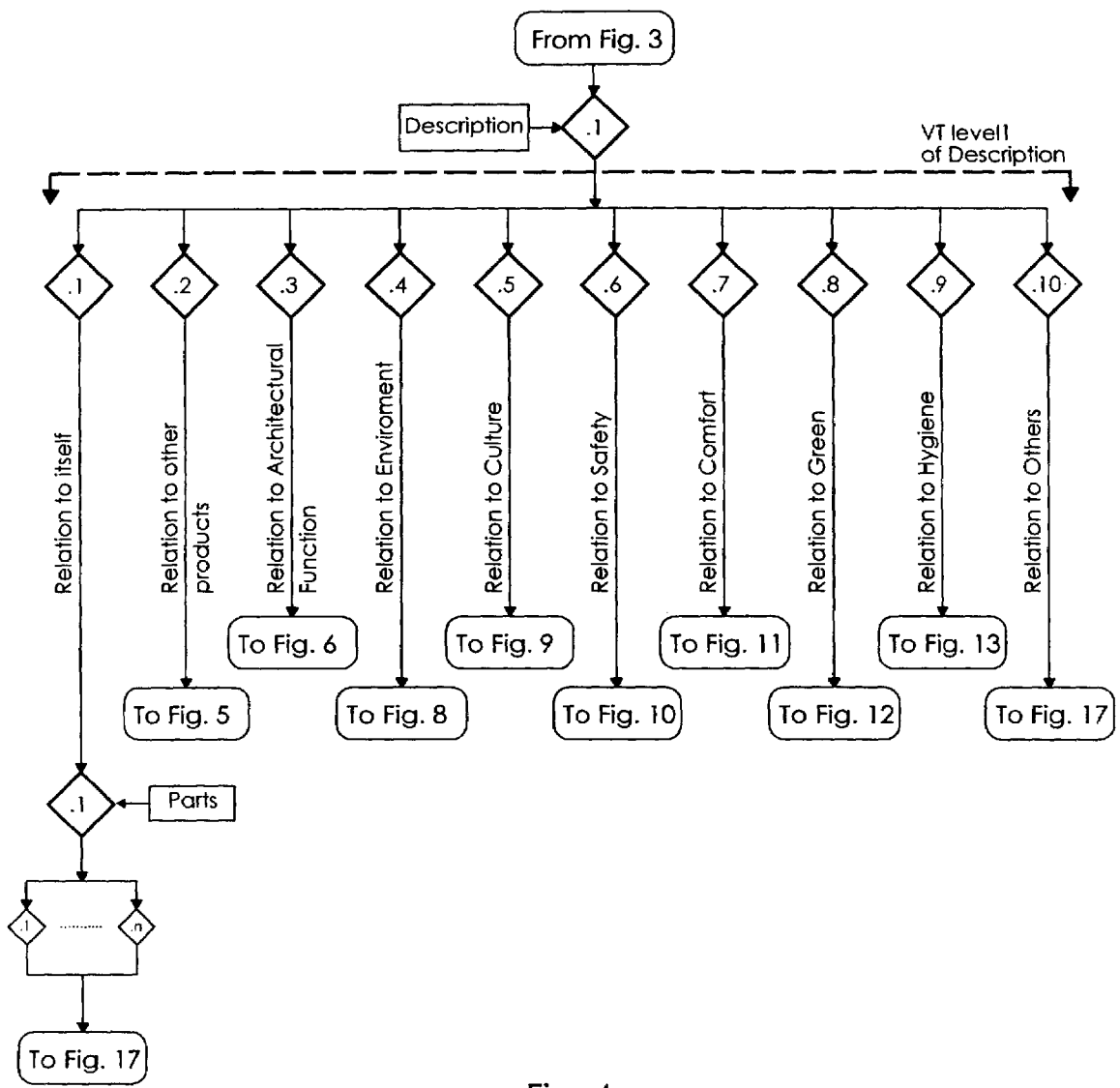
FIG. 4 is a flow chart of the specialized parameters used by the system of FIG. 1.

In FIG. 4, to set up the libraries the description parameter is expanded from the concept to various relations that a product might have. These are called Variable Tables. These Variable Tables come in different levels, and all these Variable Tables in their different levels with their expansion into items (units) are used to populate the libraries related to identify the subject of the question sentence. In this Level 1, one specifies relation to itself and the relation to other products. The expansion of the original parameters then includes all of the relations specified in FIG. 4. For example, given a product, one might want to provide the relation of the product to its parts. Thus questions might arise from the relation to the parts of the product.

Note another question might arise about relation of the product to other factors, such as a relation to an architectural function, such as a kindergarten or a school or a hospital; or relation to environment. The question could also imply relation to culture. There could be a relation to safety, relation to comfort, relation to green, relation to hygiene, relation to others. All of these relations to various factors are set up as variable tables as illustrated in FIG. 4. If the factors are further expanded as shown, for instance, in FIG. 6, one arrives at items, units or words used to populate the libraries.

Figure 5:
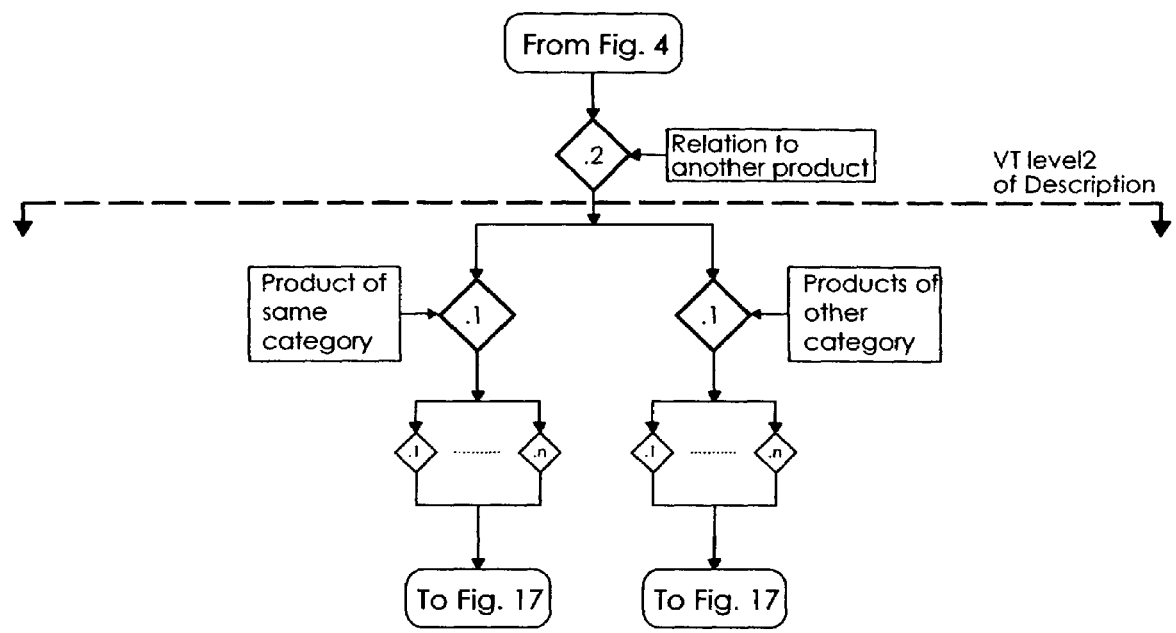
FIG. 5 is flow chart further describing specialized parameters of FIG. 4 relating the specialized parameters to other products.

Referring to FIG. 5, one is at Level 2, which expands to relations to another product, which also has 2 sub-relations: (1) relation to a product of the same category and (2) relation to a product of other categories.

The purpose of Level 2 is to expand the libraries to include all possible subjects, because the question might be related to other products or related to the same product. For example, furniture is related to tables or chairs. However, since carpet is not furniture, carpet becomes a different category to which the library must be expanded.

For instance, one might ask about how coasters will protect a Persian rug. For instance, if sharp edges affect the Persian rug, this may necessitate choosing coasters with wider surface contact to the floor. Thus the set of the libraries must include this possibility.

Figure 6:
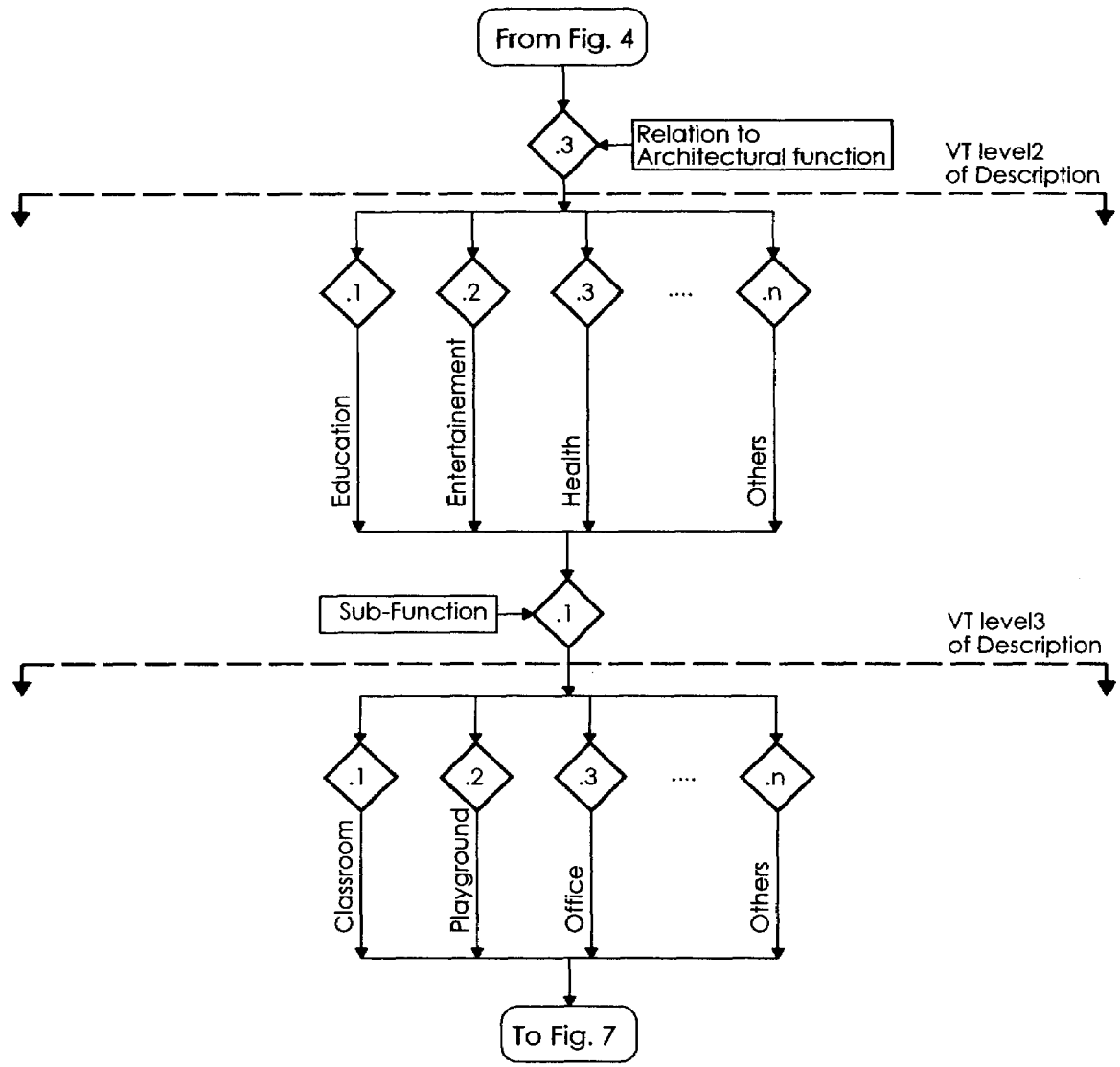
FIG. 6 is a flow chart further describing how the specialized parameters of FIG. 4 are related to an architectural function.

As shown in FIG. 6, the system in one embodiment is further expanded from the whole to the minute part of the subject.

As can be seen in this figure, for example, one has a relation to an architectural function, which is expanded to include education, entertainment, health and others. As sub-functions one could have for education, for example, a classroom, a playground, an office, et cetera. Thus there is a subdivision for expansion purposes.

Figure 7:
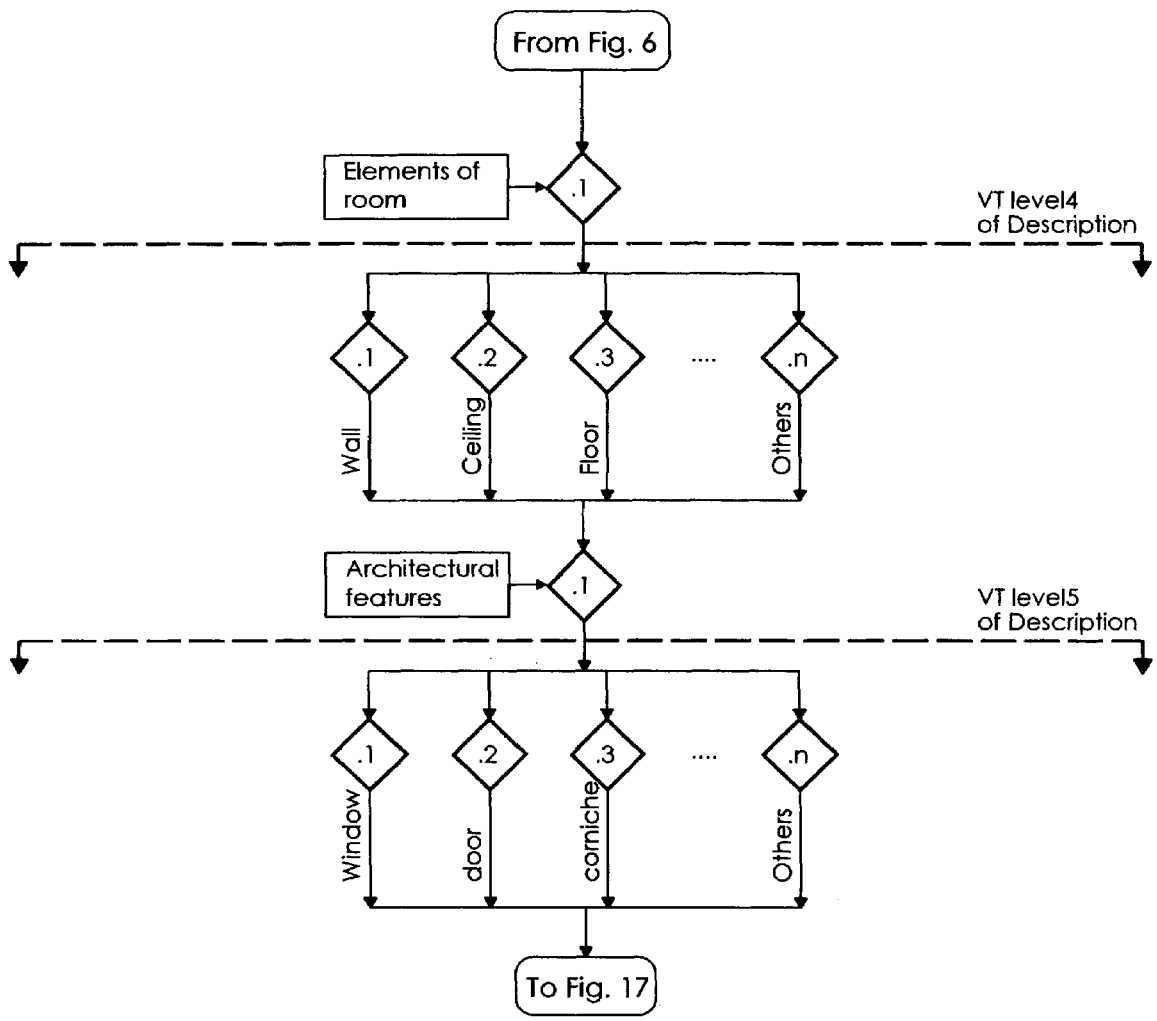
FIG. 7 is a flow chart further describing the architectural function of FIG. 6 to be used in the General Library Table of FIG. 3.

FIG. 7 illustrates a further expansion of the library tables for the architecture relation of FIG. 6. Here what is shown are the elements of a room that has previously been identified to now include, for instance, if one is asking about a classroom, the wall, the ceiling, the floor and others. This illustrates how to include all subjects in the library and constitutes a Level 4 to expand on the prior expansion.

At Level 5, shown in FIG. 7, for the architectural feature, now considering classrooms, one might be interested in the windows or door. If one is buying furniture, one might want to know the size. One might also want to know whether one could pass it through the door or not.

Figure 8:
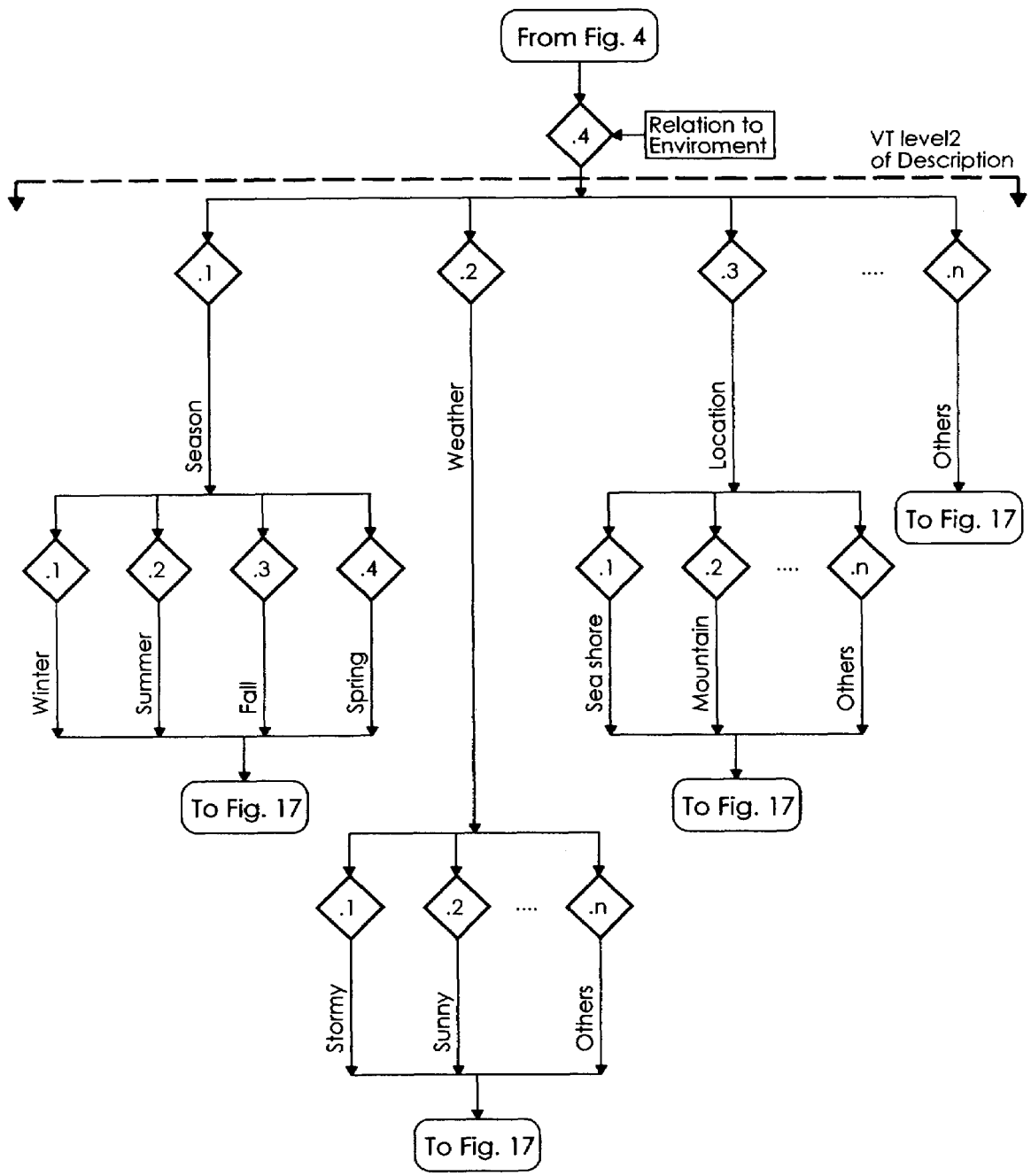
FIG. 8 is a flow chart further describing one of the specialized parameters of FIG. 4 relating the specialized parameter to the environment.

Going to FIG. 8, one can expand the relation to environment to include season, weather, location, others. Thus all of the relations can be expanded to include subrelations. Thus the above relation can be further expanded to season, e.g., winter, spring, summer, fall. Weather can be further expanded into stormy, sunny, other; or, for instance, if one is by the seashore, how salt on outside furniture affects it. If one is in a cold winter climate, the relations can be expanded to answer, how will frost affect the furniture?

Figure 9:
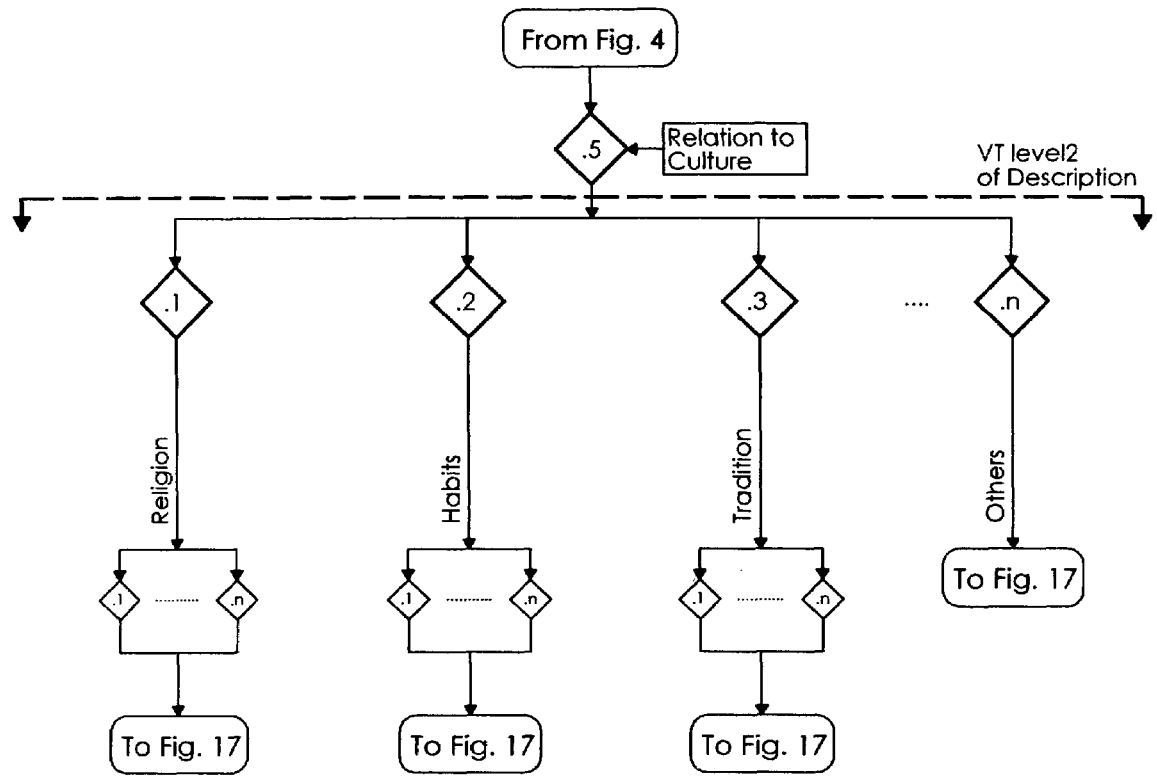
FIG. 9 is a flow chart further describing the specialized parameters of FIG. 4 relating to culture.

In FIG. 9, one expands relations to include culture, religion, habits, tradition.

Figure 10:
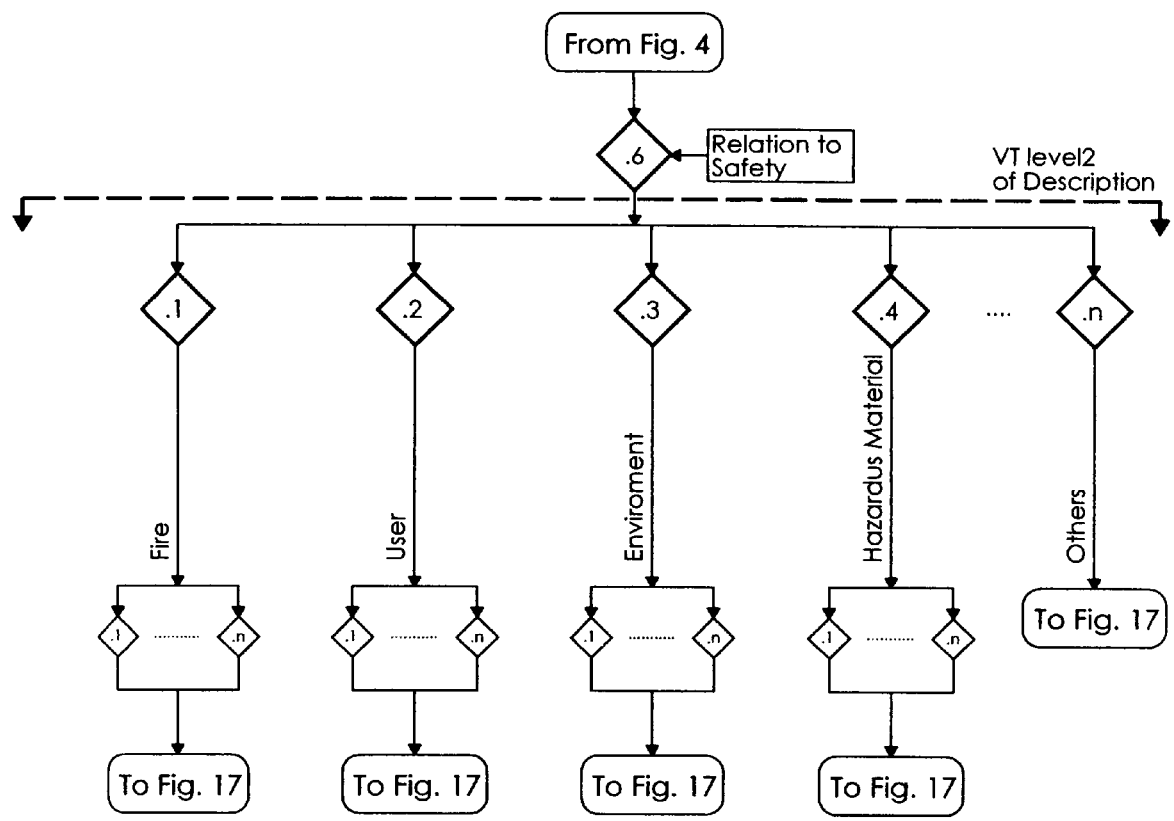
FIG. 10 is a flow chart further describing the specialized parameters of FIG. 4 relating to safety.

In FIG. 10, one expands relations to include safety, fire, user, environment, hazardous material, others.

Figure 11:
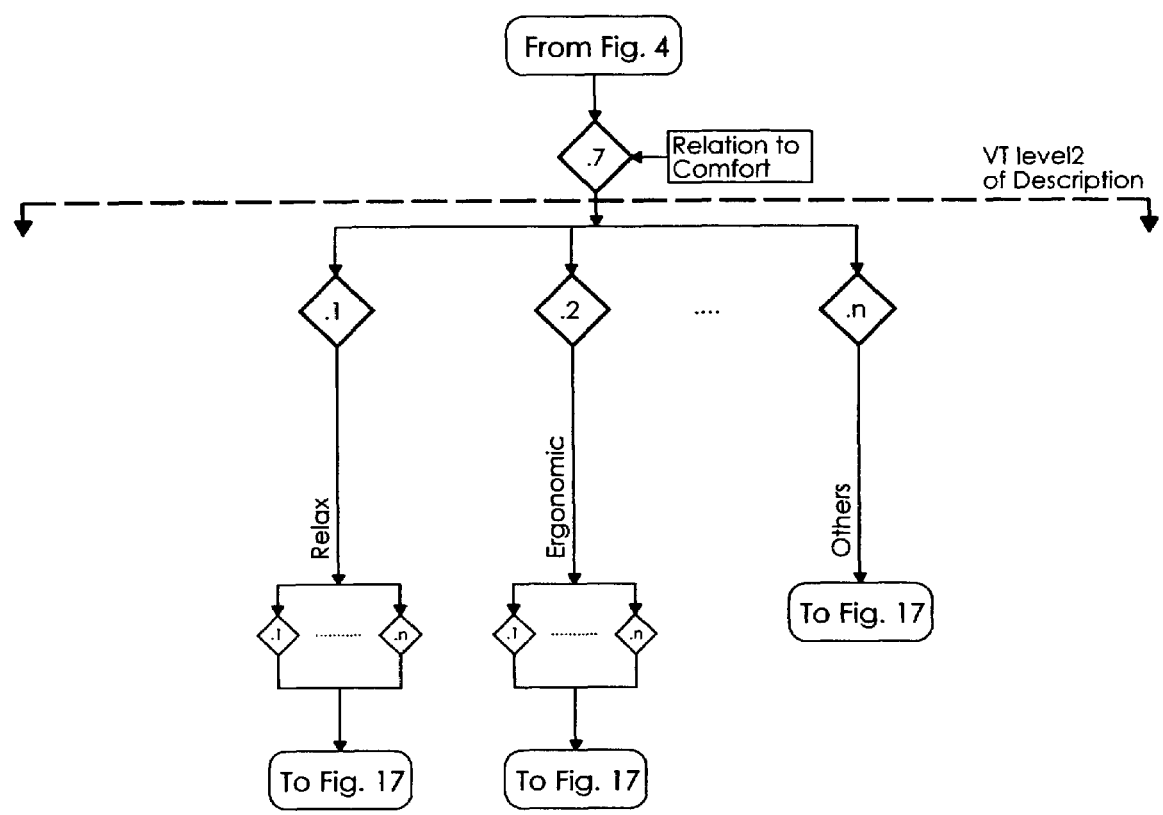
FIG. 11 is a flow chart further describing the specialized parameters of FIG. 4 relating to issues of comfort.

In FIG. 11, one expands relations to include comfort: relaxation, ergonomics, others.

Figure 12:
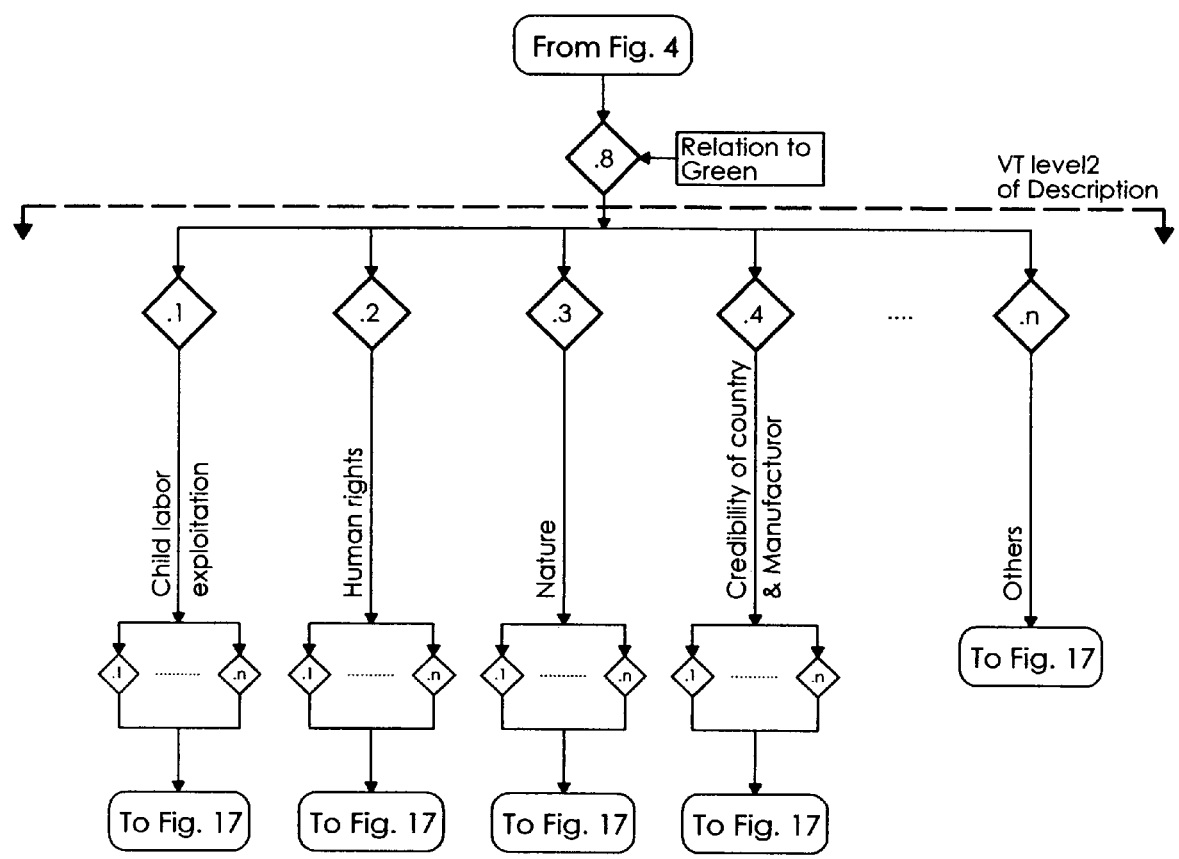
FIG. 12 is a flow chart further describing the specialized parameters of FIG. 4 relating to environmental issues referred to as green issues.

In FIG. 12, one expands relations to include green issues, such as child labor exploitation, human rights, nature, the credibility of the country to manufacture the product using green principles, or "others."

Figure 13:
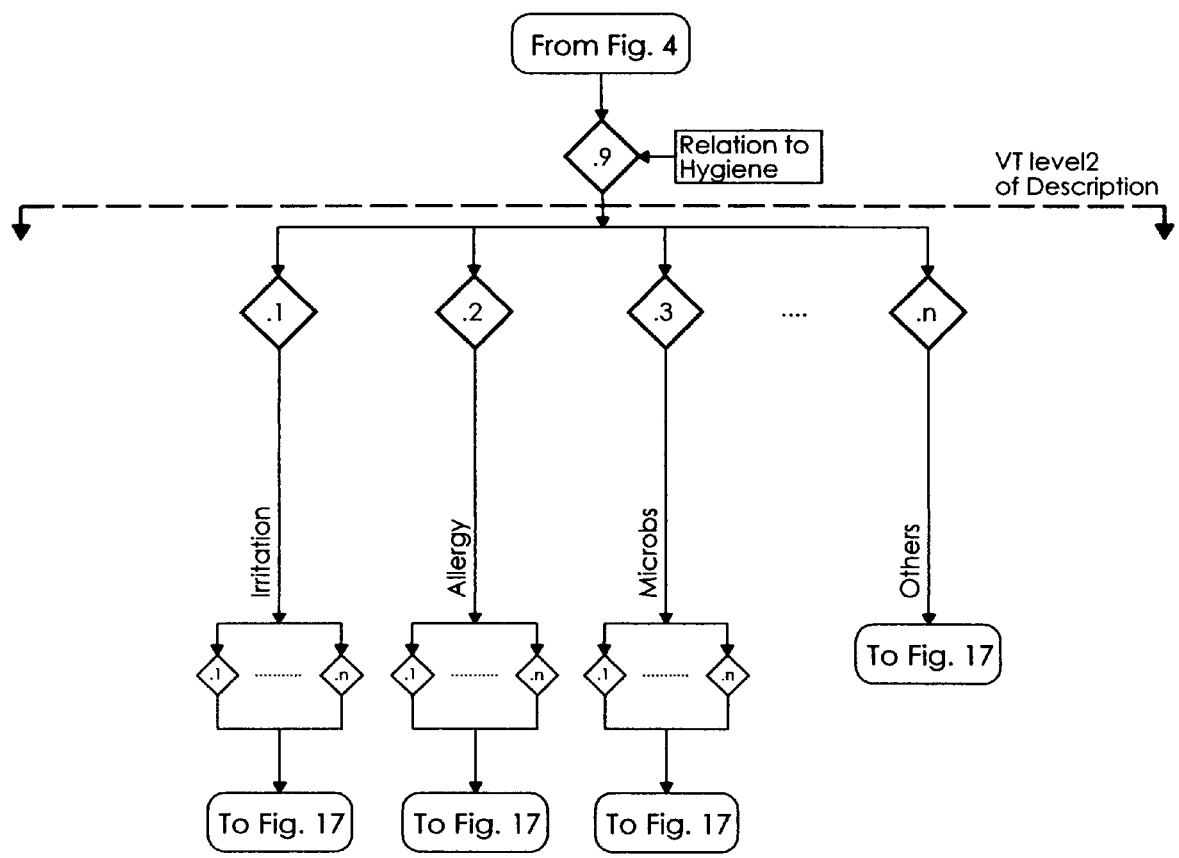
FIG. 13 is a flow chart further describing the specialized parameters of FIG. 4 relating to issues of hygiene.

In FIG. 13, one expands relations to include hygiene, irritation, allergy, microbes, or "others."

Figure 14:
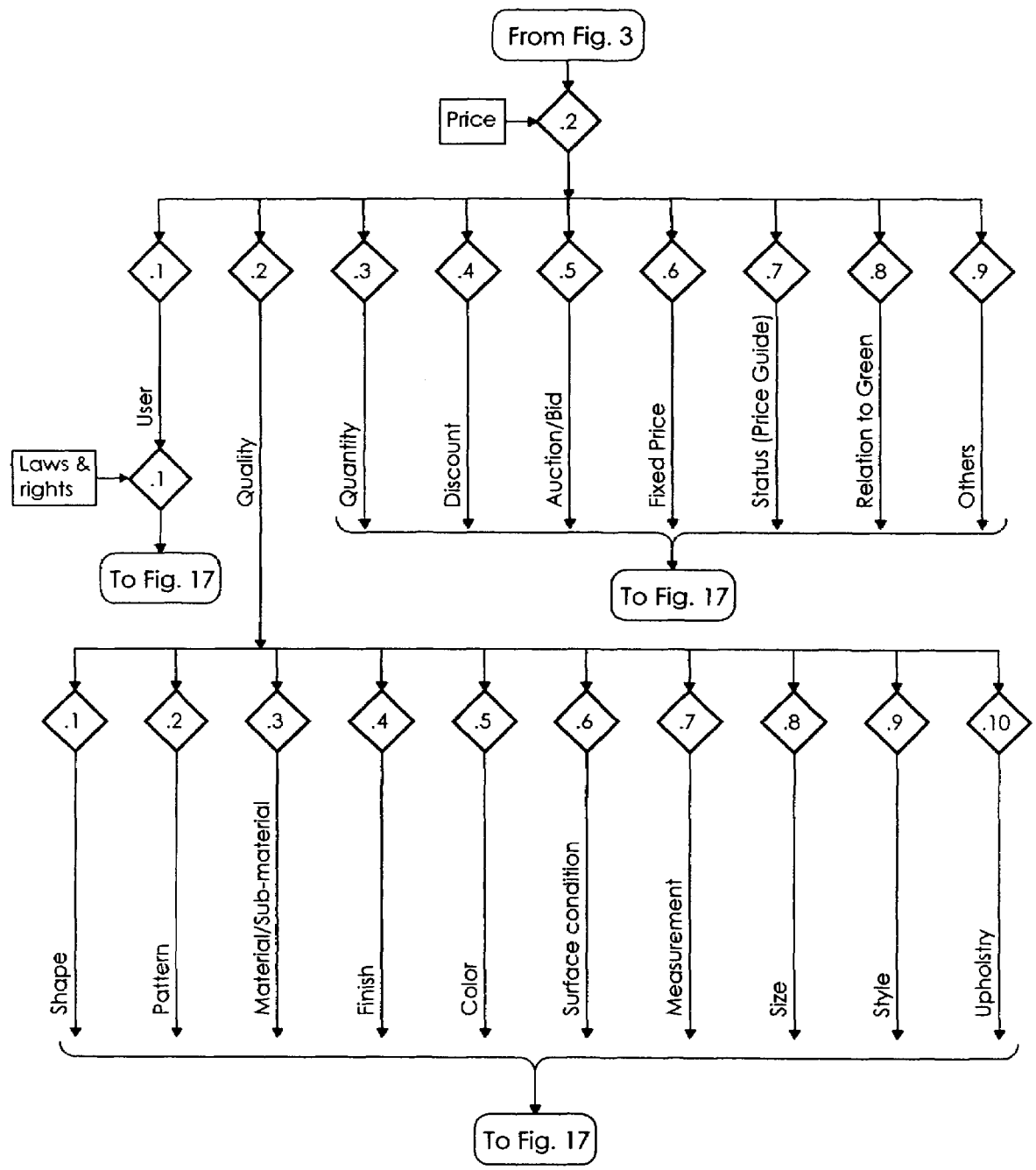
FIG. 14 is a flow chart showing how the subject system further refines the Price parameter of FIG. 3.

In FIG. 14, one expands relations to include other parameters such as for the price parameter, the laws and rights that apply in a particular jurisdiction, quality, quantity, discounts, the affect of any auction structure, fixed price and status, or additional bids.

Note that for quality one might want to expand relations relating to include shape, pattern, and how the price affects the shape. As to the pattern, there are questions that might come up through those relations.

What is therefore shown is that one can expand what is put into the libraries to include quality as it relates to shape, pattern, material, sub-material, finish, colors, surface condition, measurement, size, style and upholstery.

Figure 15:
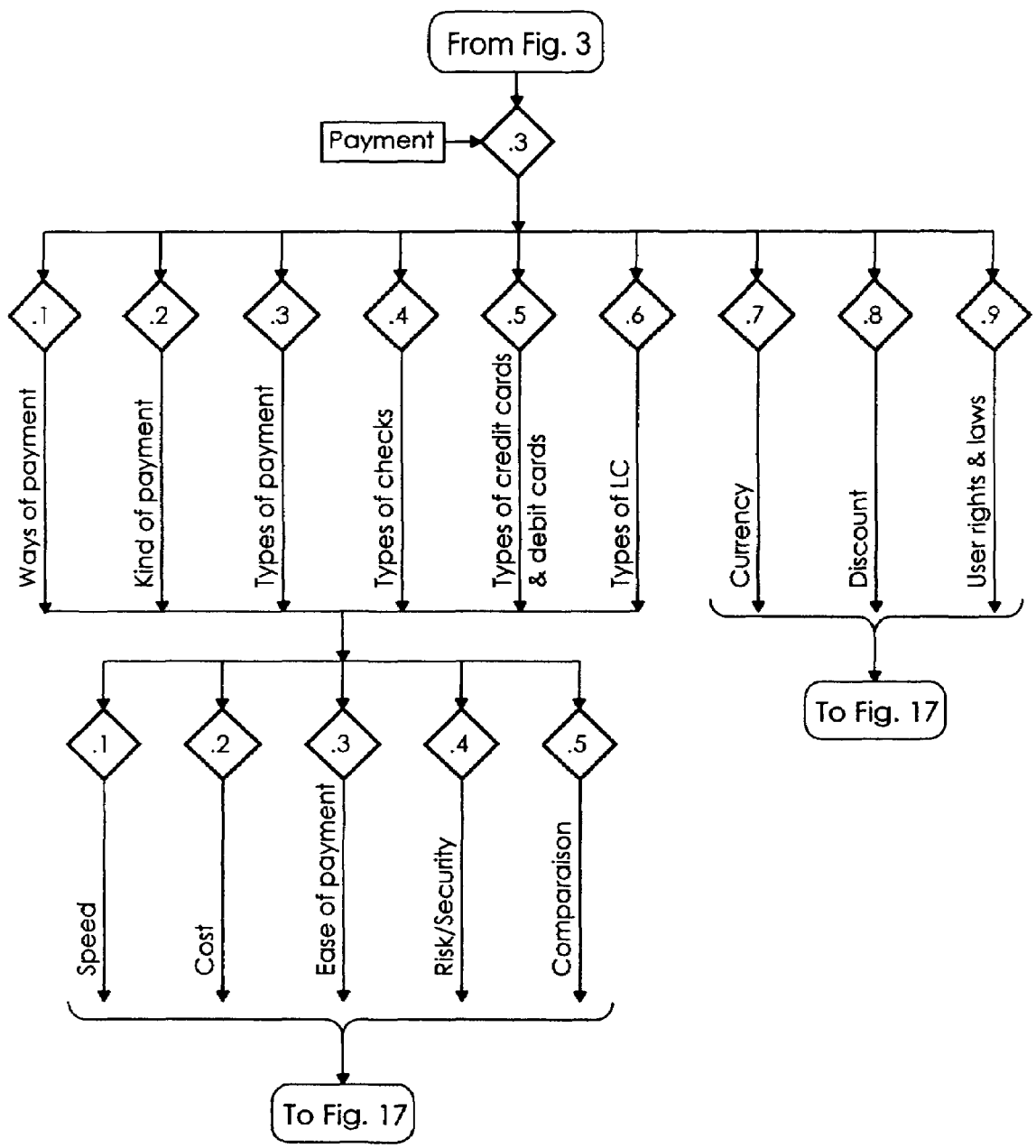
FIG. 15 is a flow chart showing how the subject system further refines the Payment parameter of FIG. 3.

As to FIG. 15, one expands the payment relationships to include ways of payment, kind of payment, types of payment, types of checks, types of credit cards and debit cards, types of letters of credit, currency, discount, and speed of payment. Speed of payment is also related to cost, ease of payment, risk-security comparison, etc.

Figure 16:
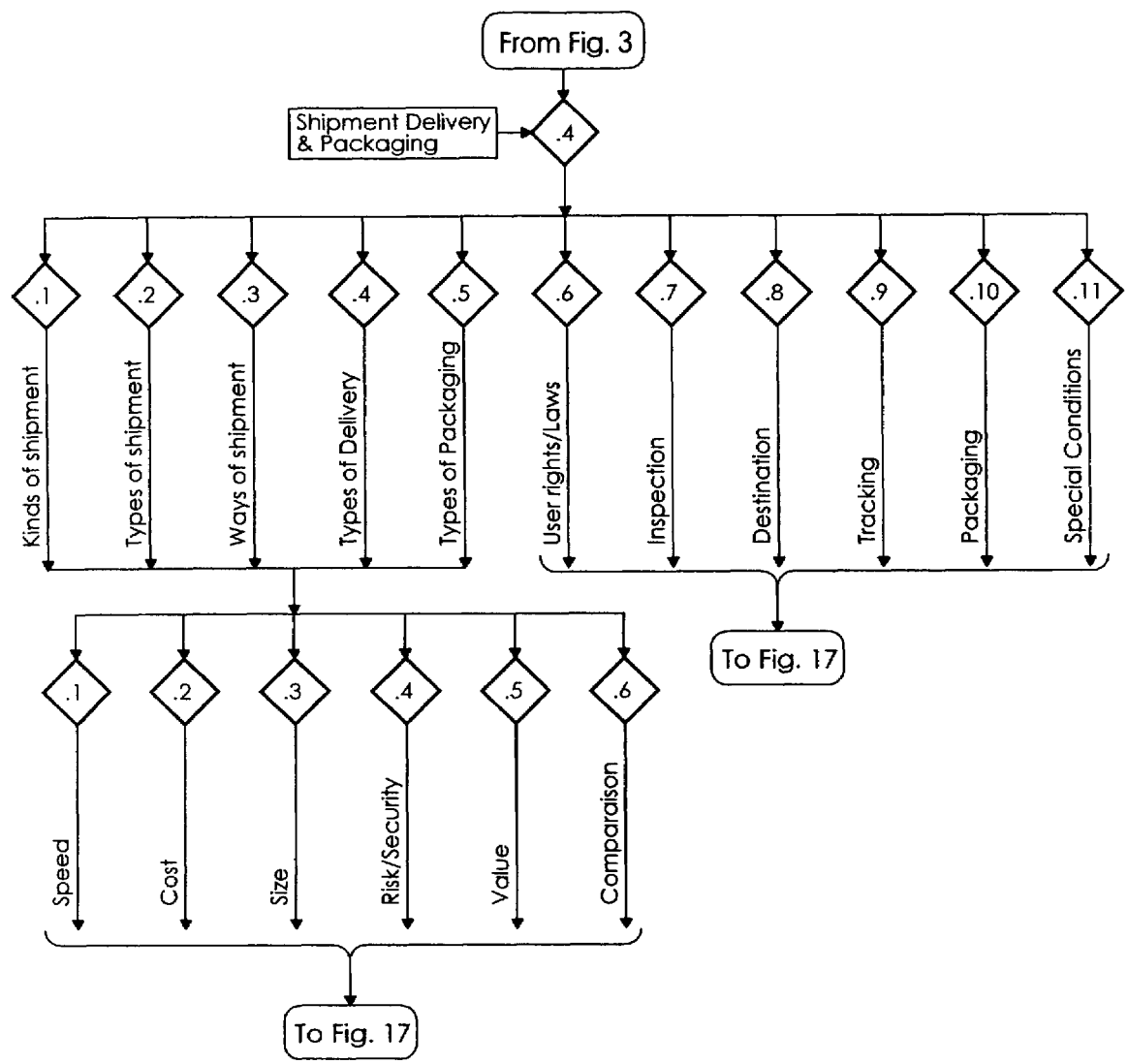
FIG. 16 is a flow chart showing how the subject system further refines the Shipment, Delivery and Packaging parameters of FIG. 3.

At FIG. 16 one expands the shipment and delivery parameter to include kinds of shipment, types of shipment, ways of shipment, types of delivery. Speed, cost and size also apply.

Figure 17:
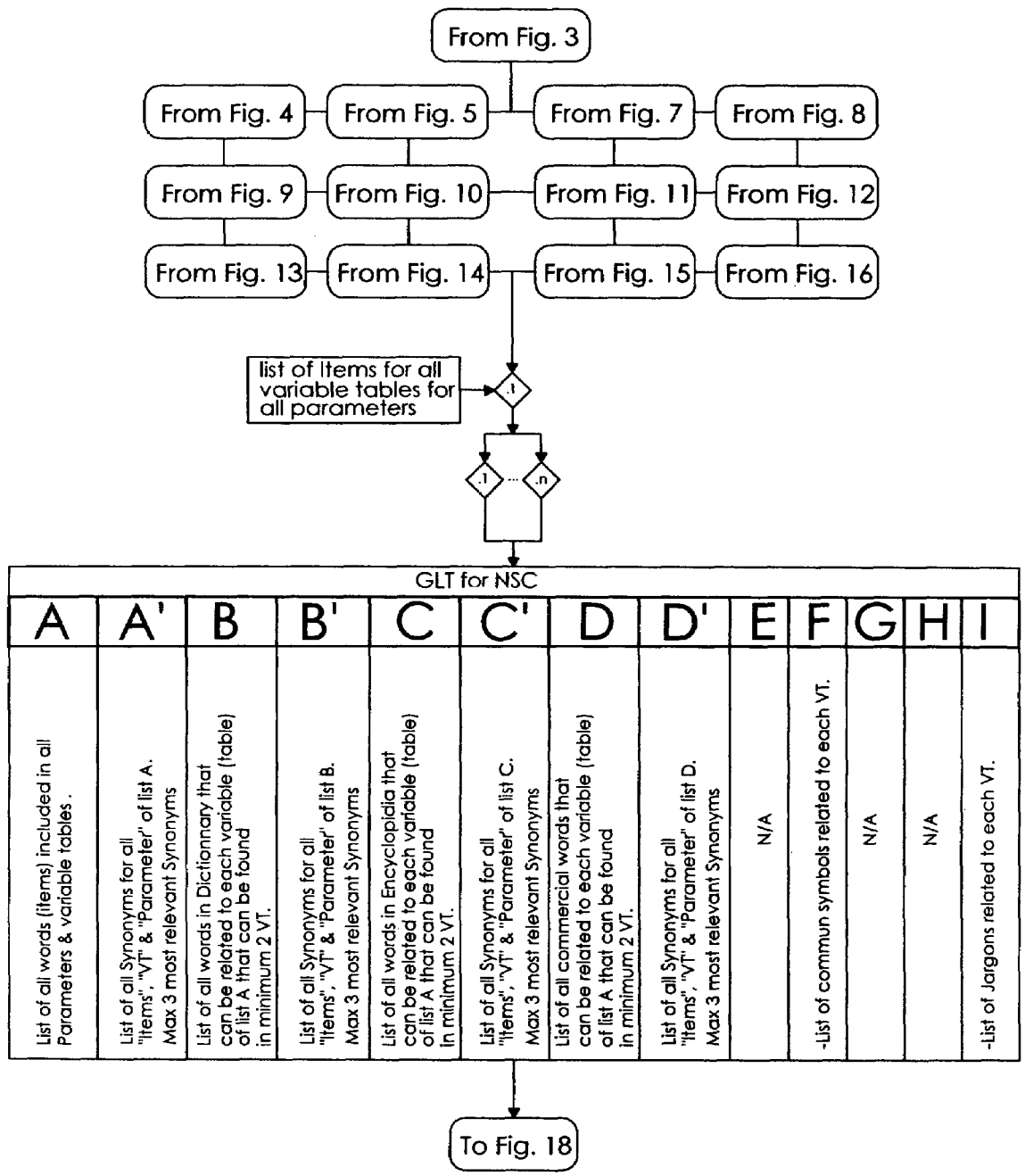
FIG. 17 is a table showing the handling of the list of items for all variable tables for all parameters by the General Library Table of FIG. 3.

As to FIG. 17, this figure describes the combined expansions described in the aforementioned figures to as to generate variable tables, and items that form the General Library Table.

The result is a fabrication of all the possible words that form subjects that can exist for products and services for a category. What is now shown is how to expand the libraries to include synonyms, symbols, jargon, and words that are related to the words compiled at FIG. 17. To do this the system makes a table called List A. This table lists all words and items included in all parameters and variable tables and items (units) related to all question sentences that a human being can ask for a particular category. The question sentence involving "subjects" must first pass through List A because List A includes all words that can compose all those subjects. Otherwise the user submits a word that the List A does not recognize, then passes through List A', which contains synonyms of words founding List A. This forms a type of filtration and recognition.

List B is the list of all words in a dictionary that can be related to each variable table of List A. The words are not dissimilar to the words in the dictionary but can be related.

A list of all the synonyms for List B is available as List B'.

List C is a list of all words in an encyclopedia that relate to the particular word in List A. i.e., for each item of variable table or parameter that applies to each item.

List C is a list of all words in an encyclopedia that relate to the particular word in List A. i.e., for each item of variable table or parameter that applies to each item.

A list of all the synonyms for List C is available as List C'.

List D relates to commercial words.

List F relates to common words as opposed to commercial words. Common symbols relate to such conventions as "versus" or "vs." Thus, if "vs" does not pass as a word; it may pass through as a symbol, meaning comparison.

List I is a list of jargon.

Figure 18:
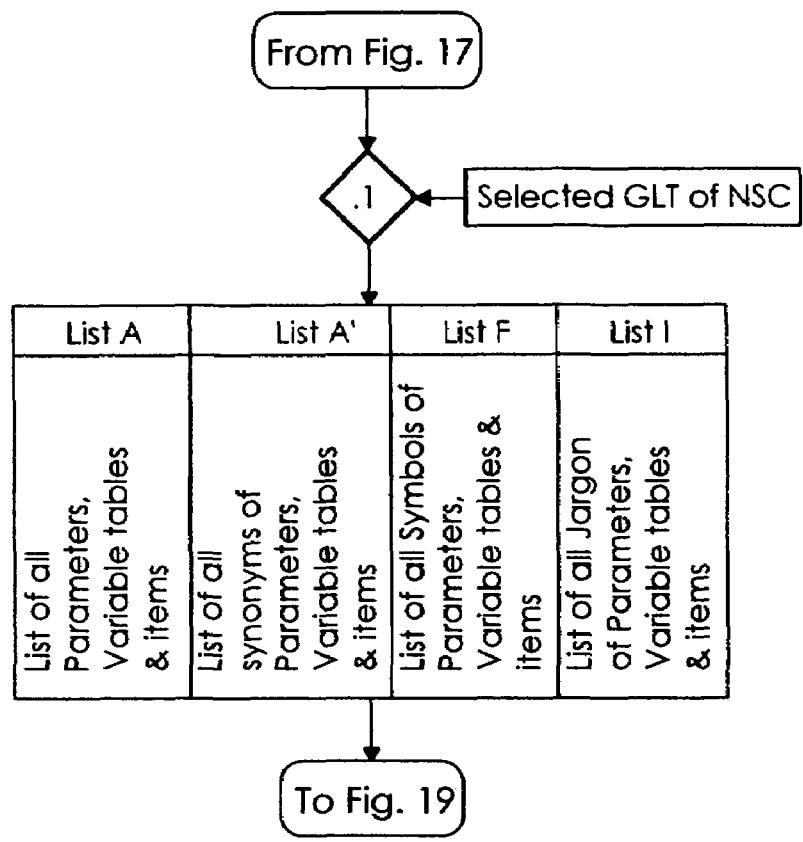
FIG. 18 is a table showing further refinement of the General Library Table of FIG. 3 by generating a Selected General Library Table.

As described above, one needs to create the Selected General Library Table. This is shown in FIG. 18. As shown, List A, A', F- and List I are selected. Thus what is seen in FIG. 18 is a sub-section of the General Library Table created in FIG. 17.

Basically, what FIG. 18 shows is that, of all the possible lists from FIG. 17, one is selecting List A, List A', List F and List I.

As an example, take the heights of people. One has a room that is only one meter high. So one has to select those people who are one meter and less. In that room, the door is only one meter. So one cannot take the rest of the people who are two meters high. One therefore needs a selection.

Figure 19:
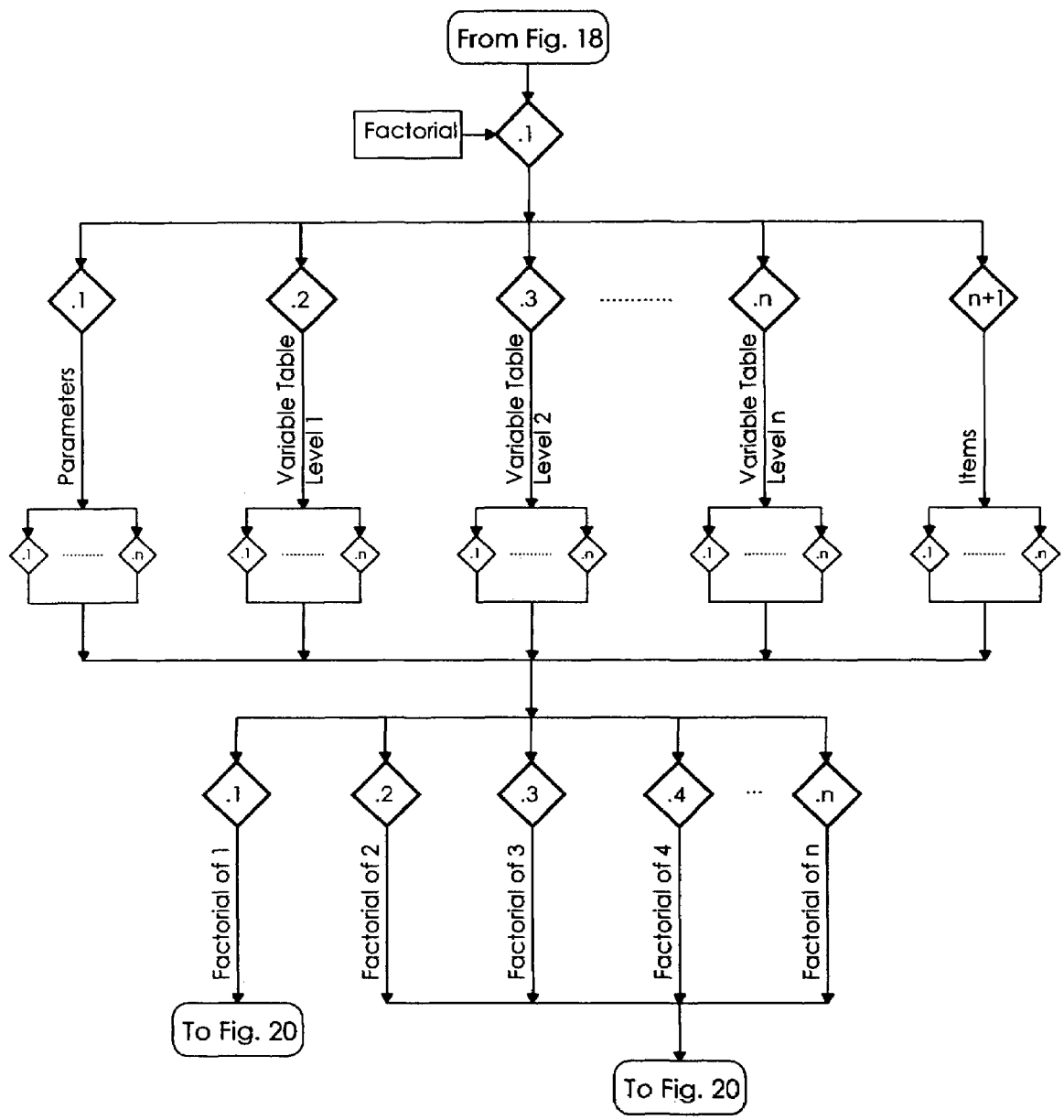
FIG. 19 is a flow chart showing the factorializing of the parameters, variable tables and items available from the Selected General Library Table of FIG. 18.

Referring to FIG. 19, what are shown are factorials that specify relations between items or words in the libraries. "Factorials" refers to all of the possible relations of the words populated in the libraries that come from parameters, variable tables, and items or units. One has millions of relations existing in the libraries. One needs to be able to limit the relations to be considered by an expert in answering a question. The system requires a mathematical factorial of only two relations between subject words. The system then outputs all factorials of one or two. The system then sorts the filtered items into factorials. The first factorial is One by itself. For instance, if asking a question about only price, this is Factorial One. For a factorial of two, one could have, for instance, price and something or poly and something else.

For practical purposes the system is limited to a factorial of 2 so as not to overwhelm the expert.

Figure 20:
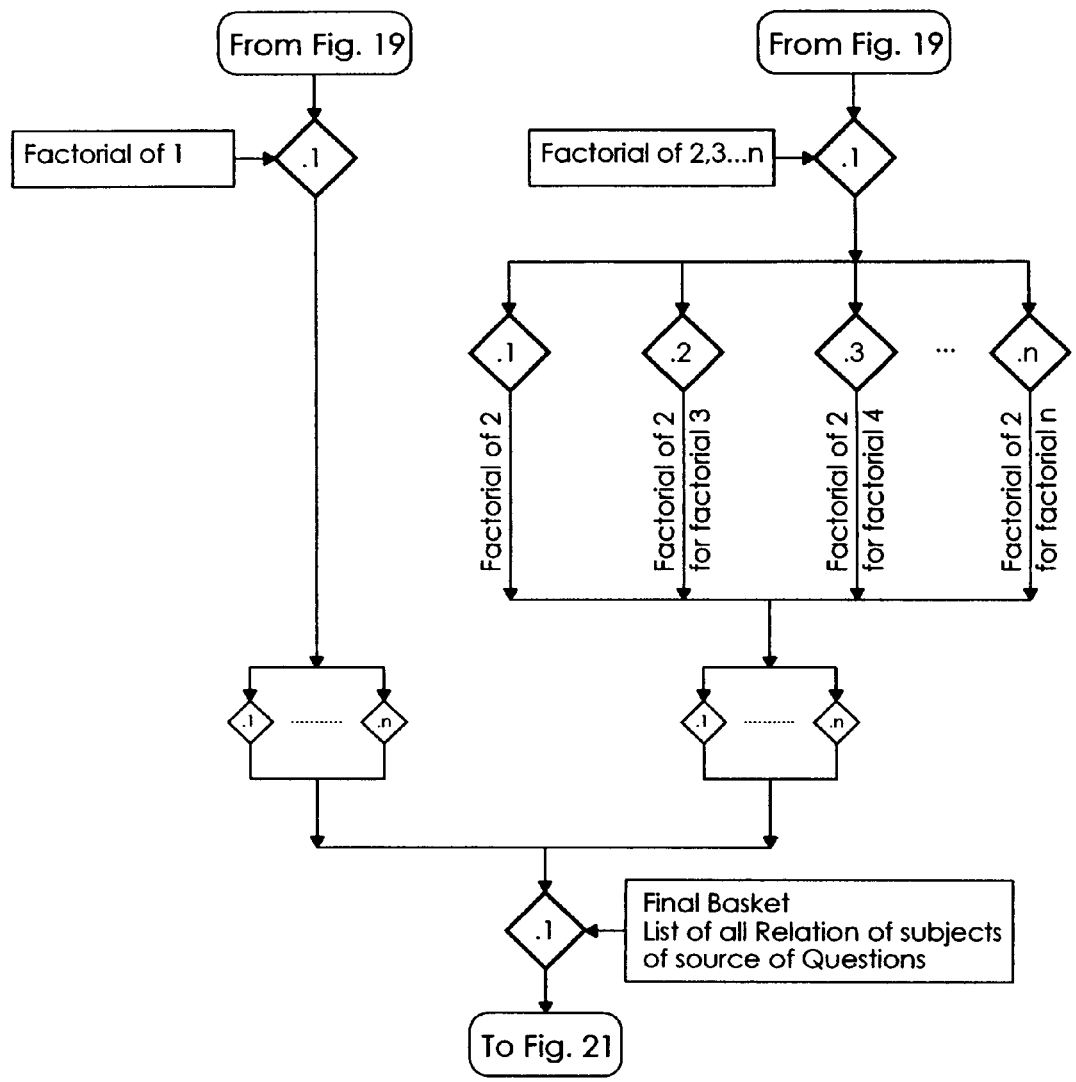
FIG. 20 is the final basket List based on the factorializing of FIG. 19, with the final basket List providing all relations of the subjects based on the source of the question.

FIG. 20 shows the extraction of only Factorial One and Factorial Two, which are put into a basket. This lists all of the possible relations between two words that are selected for this purpose.

Figure 21:
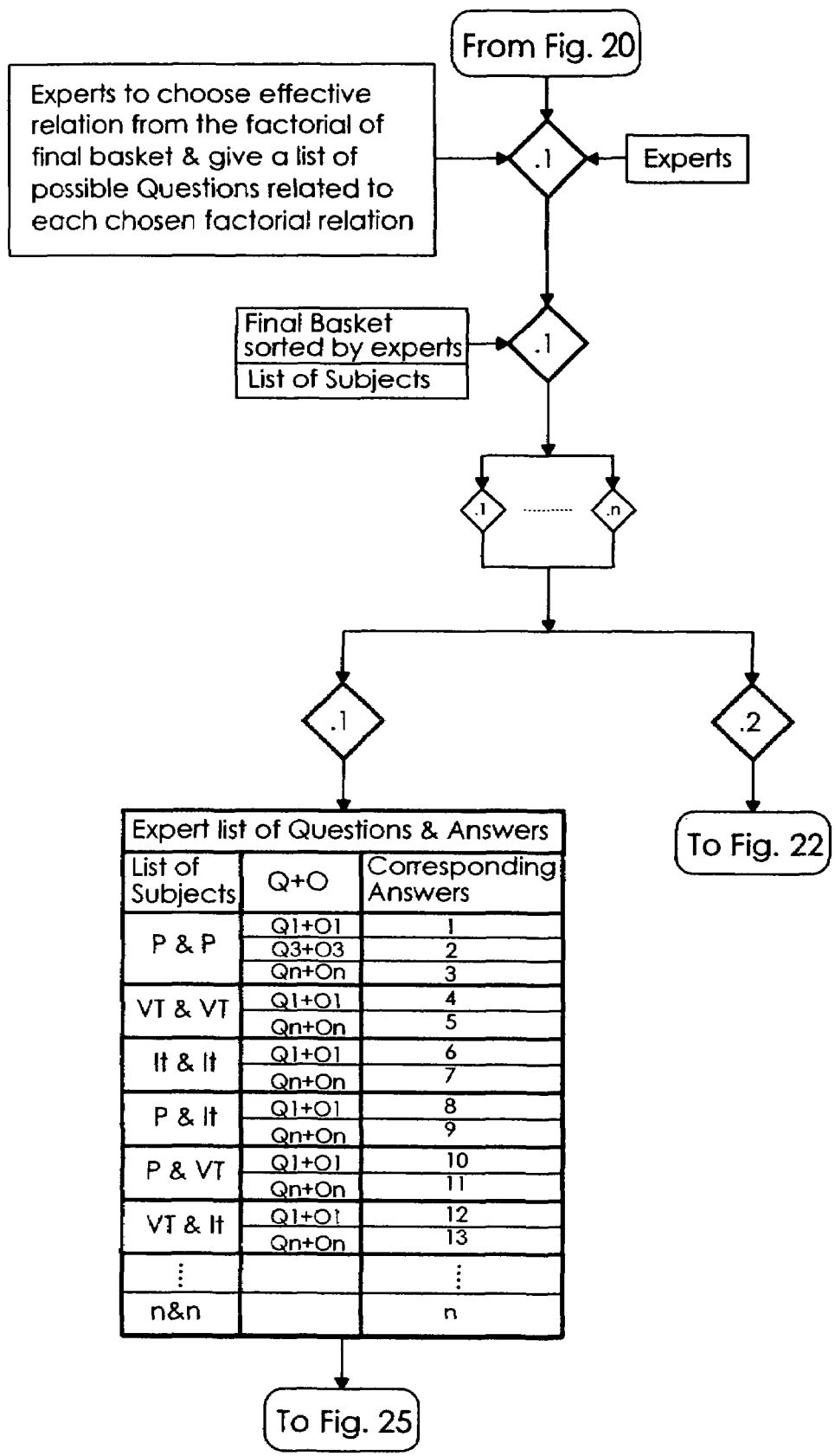
FIG. 21 is a table of the list of questions and answers chosen by the experts that constitutes an Expert List of all subjects.

FIG. 21 relates to the expert. The basket of FIG. 20 is supplied to the expert, who takes all these relations and filters them as to which are real or realistic. Up to this point the selection is mathematical. This results in a final basket as sorted by experts. The expert then, for those relations, generates a list of the subjects; for instance, P & P or VT & VT or IT & IT or P & IT or P & VT or VT & IT, which compose a subject along with its corresponding possible question forms (Q1+O1), (Q3+O3) and (Q4+O4). Each question form related with this subject (A and 1) forms a question which has a specific and precise answer (1, 2, 3, ... n). The question and answer can be depicted as follows.

Figure 22:
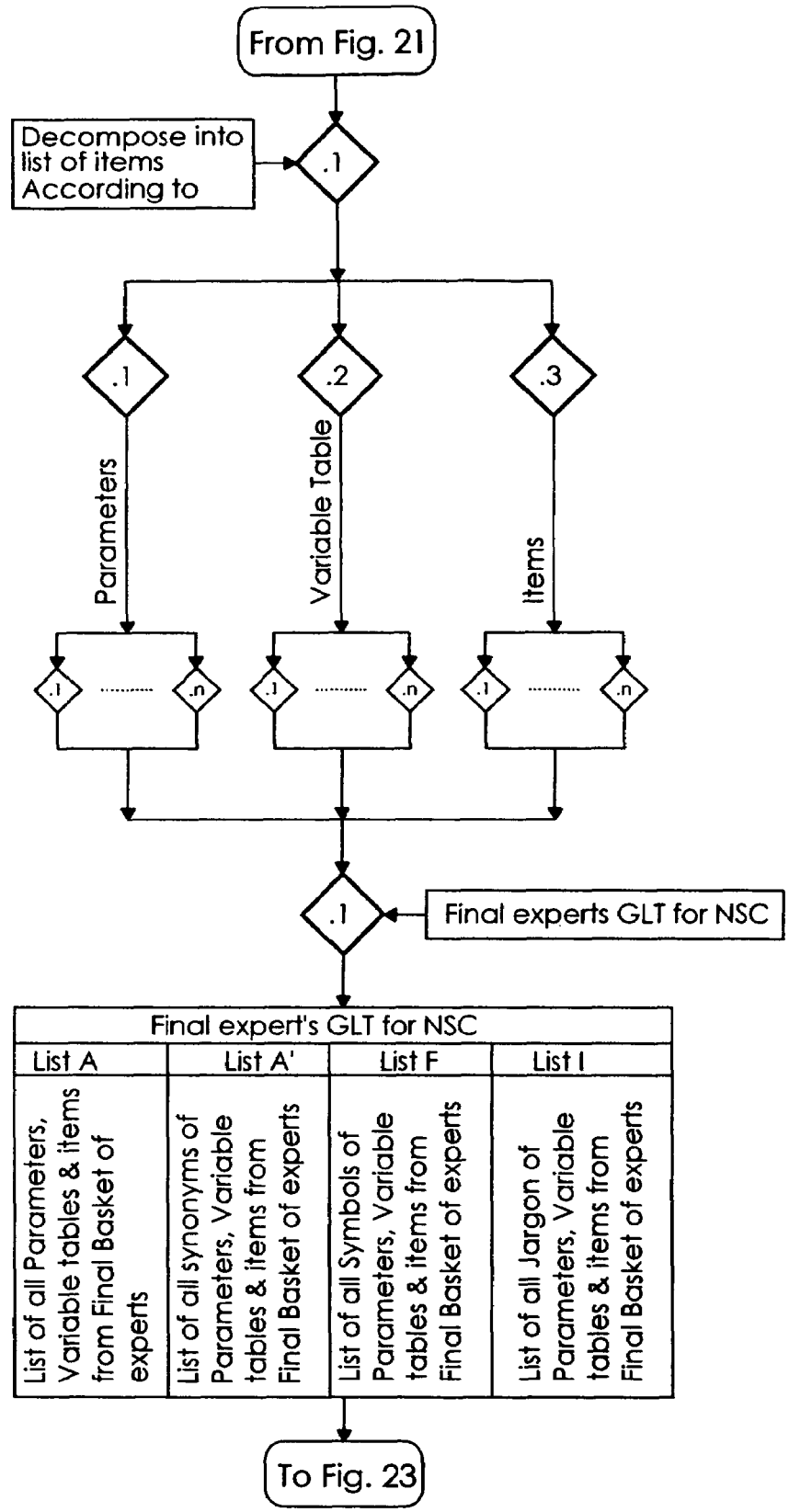
FIG. 22 is a table representing the Final Expert's General Library Table after decomposing the lists of questions and answers from FIG. 21.

As seen in FIG. 22, from all relations the expert has selected realistic relations. Knowing the associated words, these words are used to populate the Expert General Library so that the relations that are chosen by the expert populate this Expert General Library Table.

Figure 23:
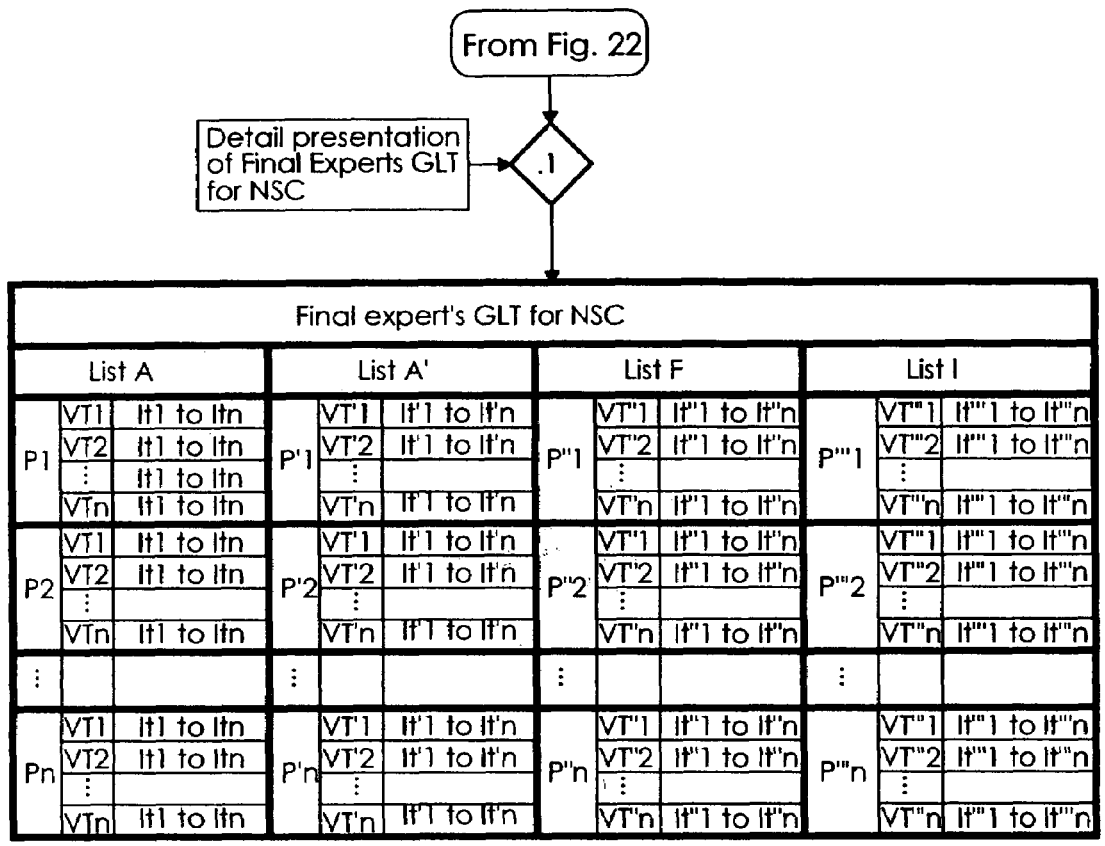
FIG. 23 is a flow chart that constitutes the final Expert's General Library Table used to obtain an answer to a user's question.

FIG. 23 describes FIG. 22 in more detail. FIG. 23 shows parameter 1, variable table 1, item 1 to n. Thus, at the end, this is the set of final words or units that a subject might be composed of.

Figure 24:
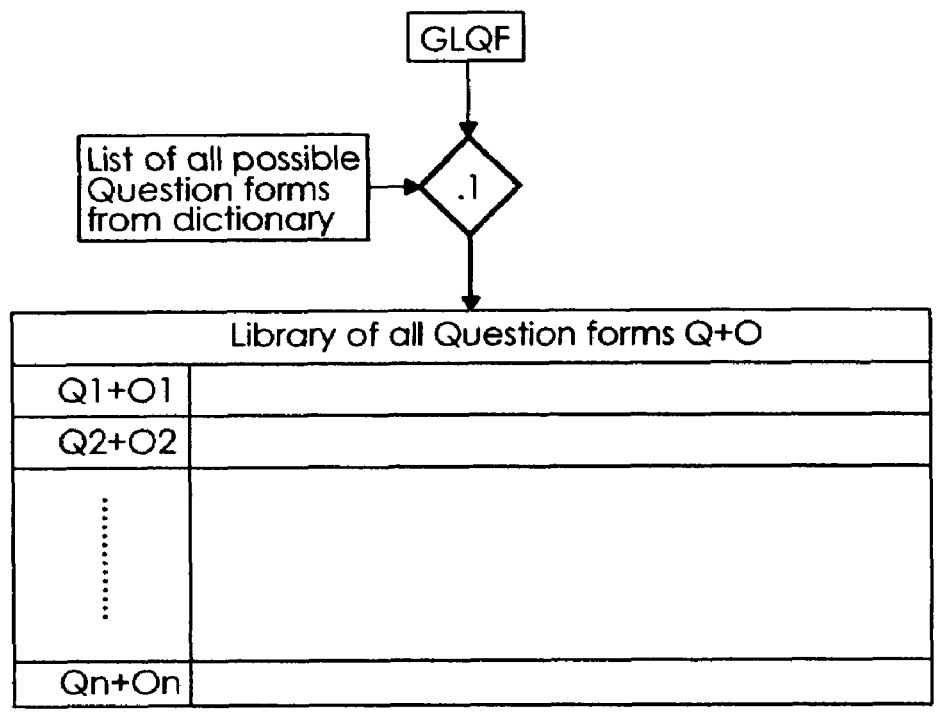
FIG. 24 is a table based on the General Library of Question Forms that lists all question forms.

FIG. 24 describes a library of all possible question forms and words to complete question forms (Q+O) from a dictionary called the General Library of Question Forms.

Figure 25:
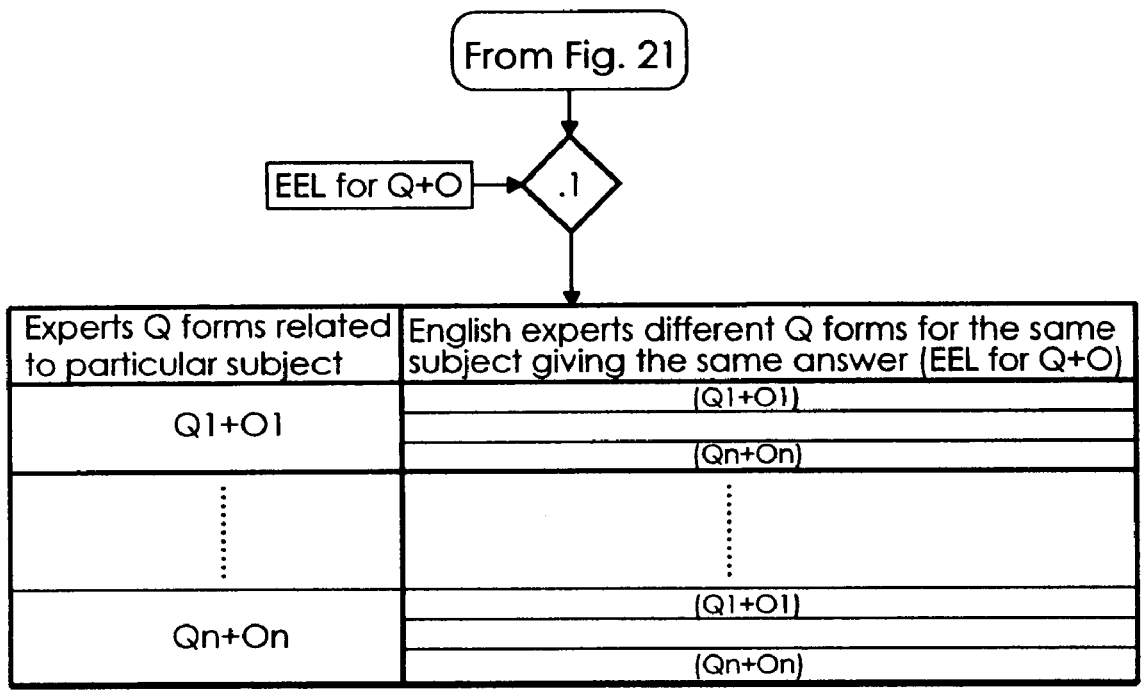
FIG. 25 is a table representing the English Expert Library that for a particular subject provides different question forms giving the same answer.

FIG. 25 describes creation of the table that relies on English experts to define different forms of a question for the same subject that give the same answer.

What has been described before, is how to populate all of the libraries so that a question can be understood and an appropriate answer given.

Runtime

Figure 26:
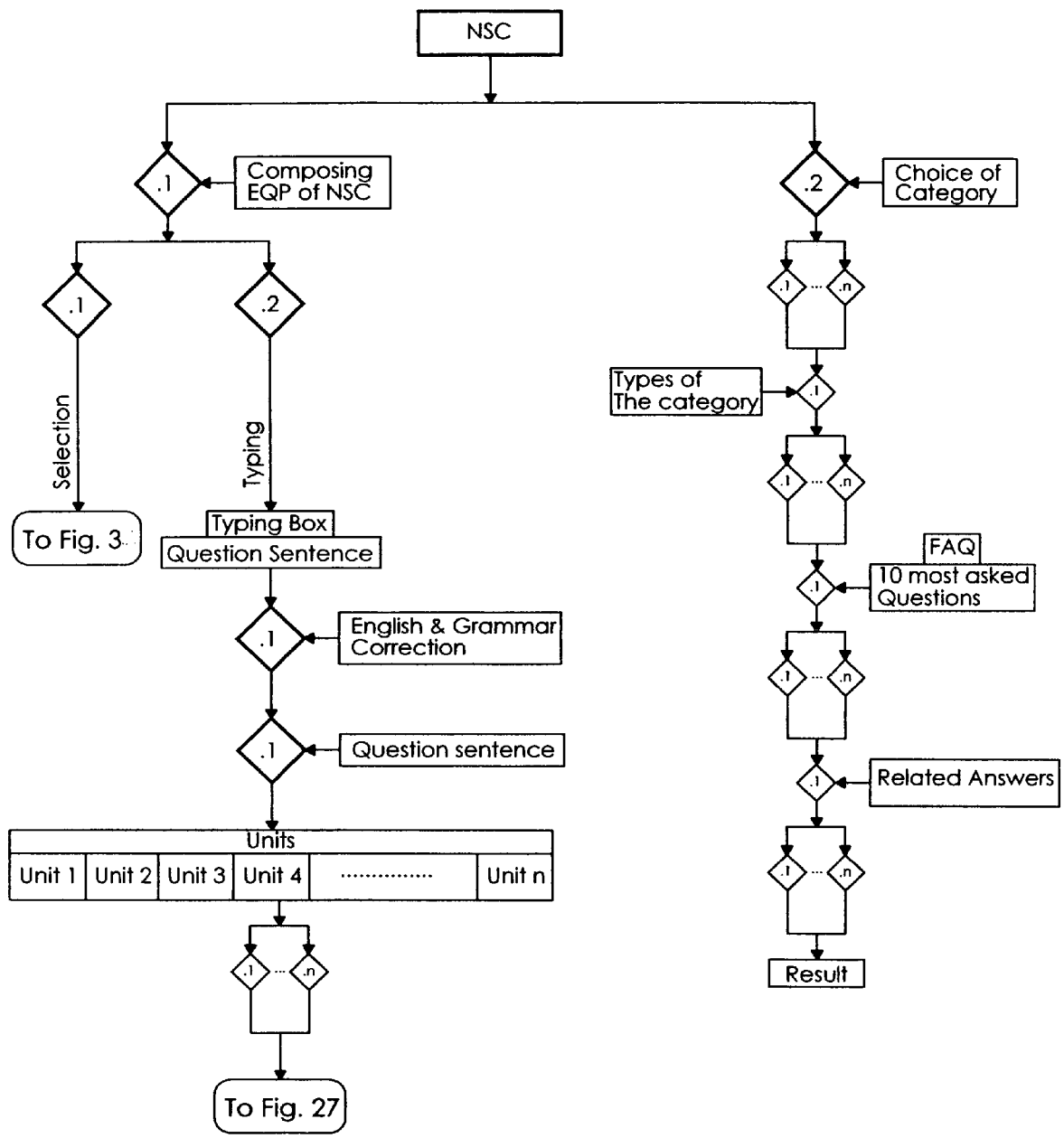
FIG. 26 is a flow chart that shows the composing of the fingerprint or electronic query print used by the Neutral Sales Consultant system.

Referring to FIG. 26, one first develops a question sentence. One has the choice between selection and typing.

Assuming one selects typing, one types in the question sentence and passes it through an English grammar correction engine. This generates the aforementioned units corresponding to words and symbols of the question sentence. At the same time, if a user wishes to know about any specific product, the user chooses a category in the form of a set menu that gives, for instance, the most asked questions of that specific product and their related answers.

Figure 27:
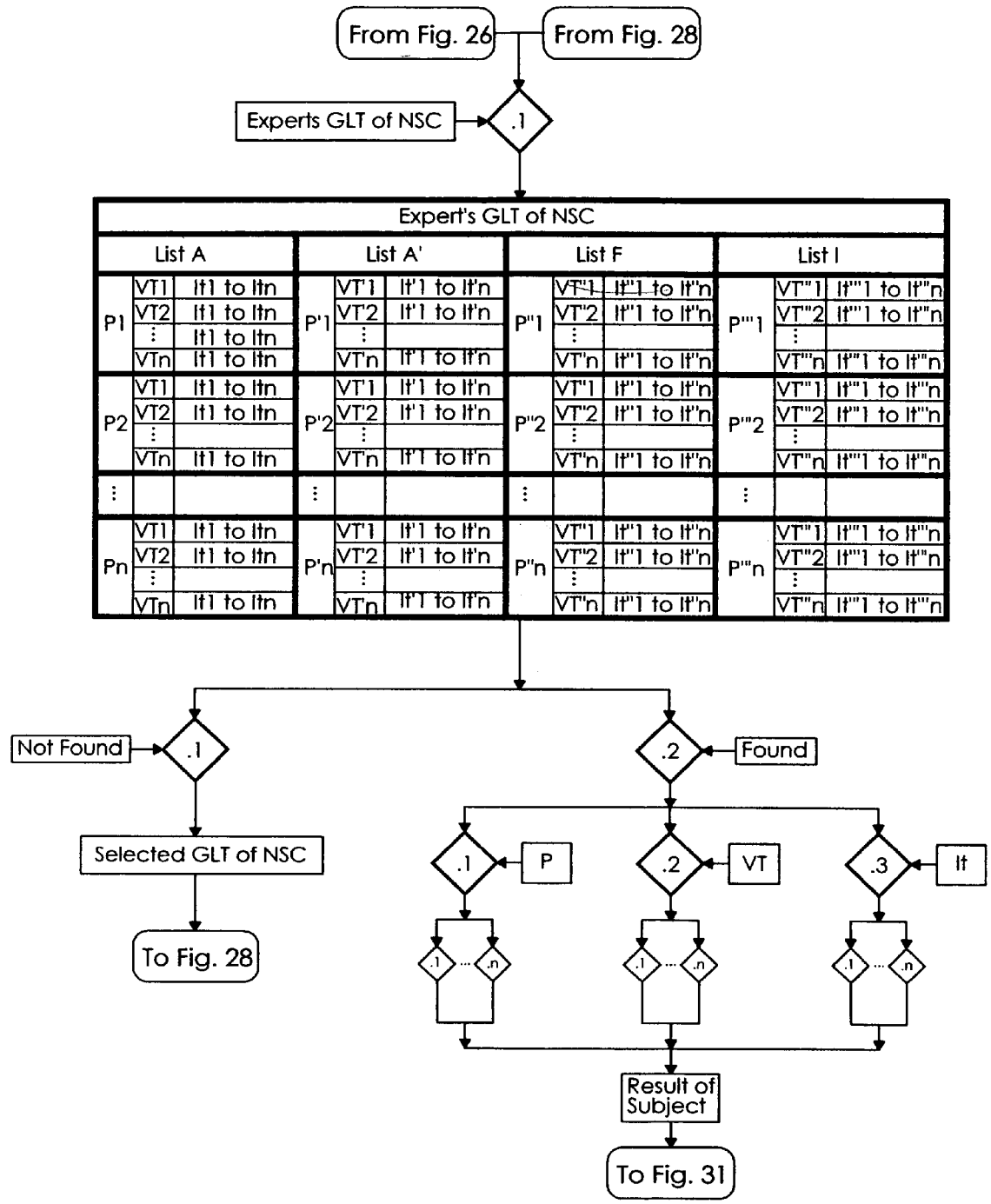
FIG. 27 is a diagrammatic representation of the Expert's General Library Table of FIG. 23.

As seen in FIG. 27, the Expert's General Library Table is accessed by the units of FIG. 26 or a filtered input, as will be described in FIG. 28, and constitutes the Selected General Library Table. Here one passes the units through the previously created Expert General Library Table that contains List A, List A', List F and List I. Items not found will go to the Selected General Library Table of the Neutral Sales Consultant to FIG. 28.

Figure 31:
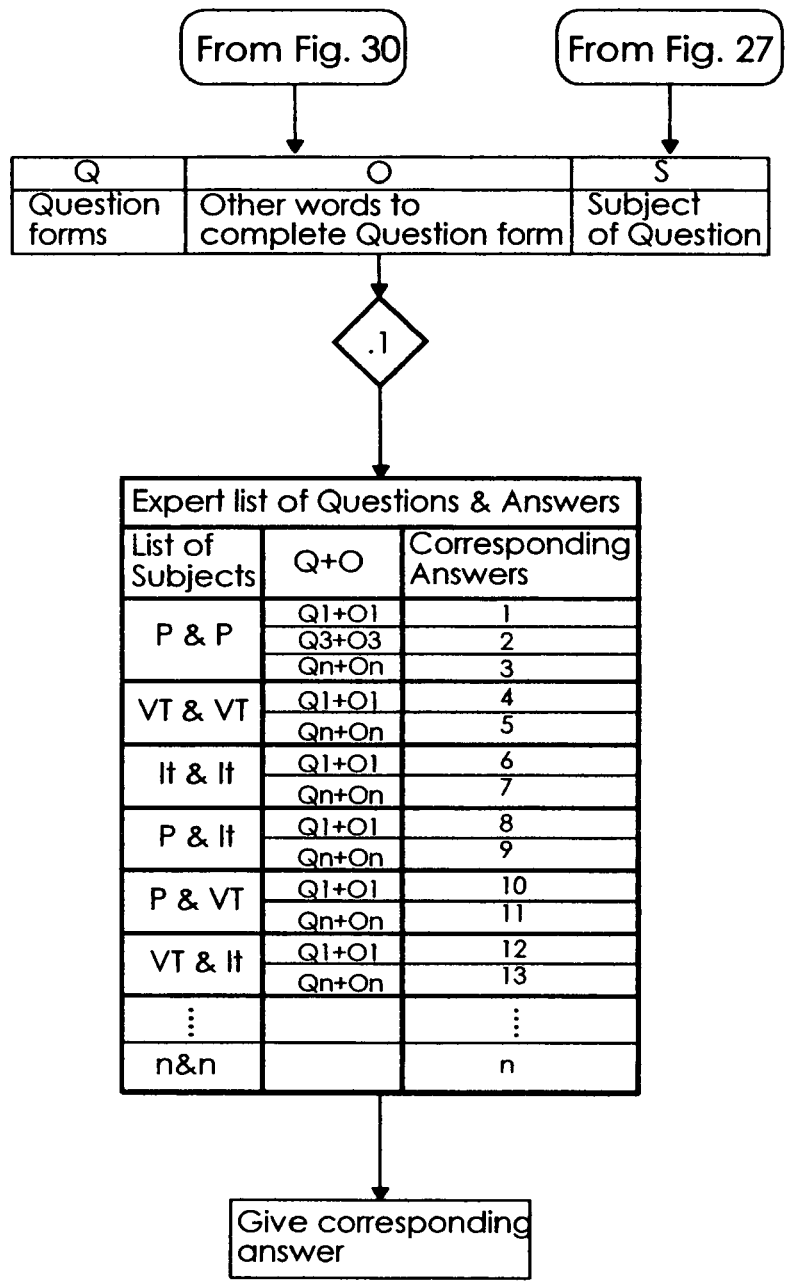
FIG. 31 is a table constituting a list of subjects and all their questions and answers

What is seen in FIG. 27 is a first filtration of the question sentence performed by the Expert's General Library Table that was defined in FIG. 23. One obtains items in Lists A, A', F and I. Note that an item found in the Selected General Library Table may not be found in the Expert's General Library Table. "Found" means that the subject, S of the query has been identified as shown in FIG. 31, where the expert has been given the S and recognizes the S.

Figure 28:
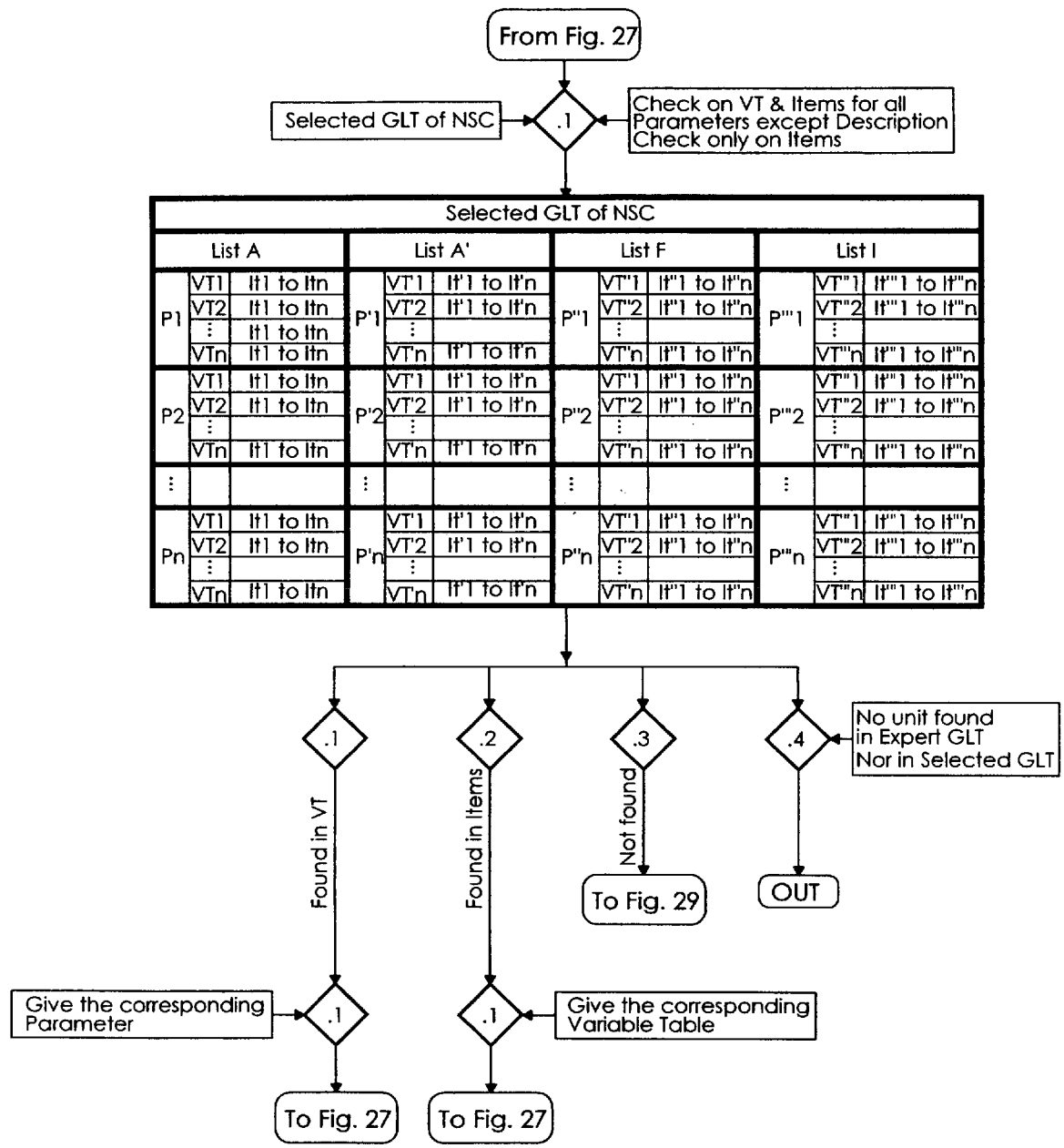
FIG. 28 is a diagrammatic representation of the detail of the Selected General Library Table of FIG. 18.

If the item is not found in the Expert General Library Table one then needs to go to the Selected General Library Table of FIG. 28. The reason this is done is because the Selected General Library Table, set by the system, is less filtered then the expert one. It is possible that the expert did not include an item in his list because for him it was not strongly related. If the item is not found, the system is interrogated at a higher level, i.e., a higher level of filtering which is more general.

One then goes one level higher. At one level higher, one goes back to the Expert's General Library Table. For instance, if one specified a color and the system did not find the specific color, the system goes up a level to a level of general "color." Therefore, the relation specified is "color," not to the particular color but all colors.

Referring now to FIG. 28, the subject of the question sentence is entered into the Selected General Library Table, which presents four options. The units might be not found, which results in the sentence being sent to the Question Form engine of FIG. 29. Now one takes all items of the question sentence that were not found in the Selected General Library Table. The system now filters the part of the question which is the question form and other words to complete the question forms in the General Library of Question Forms.

Figure 32:
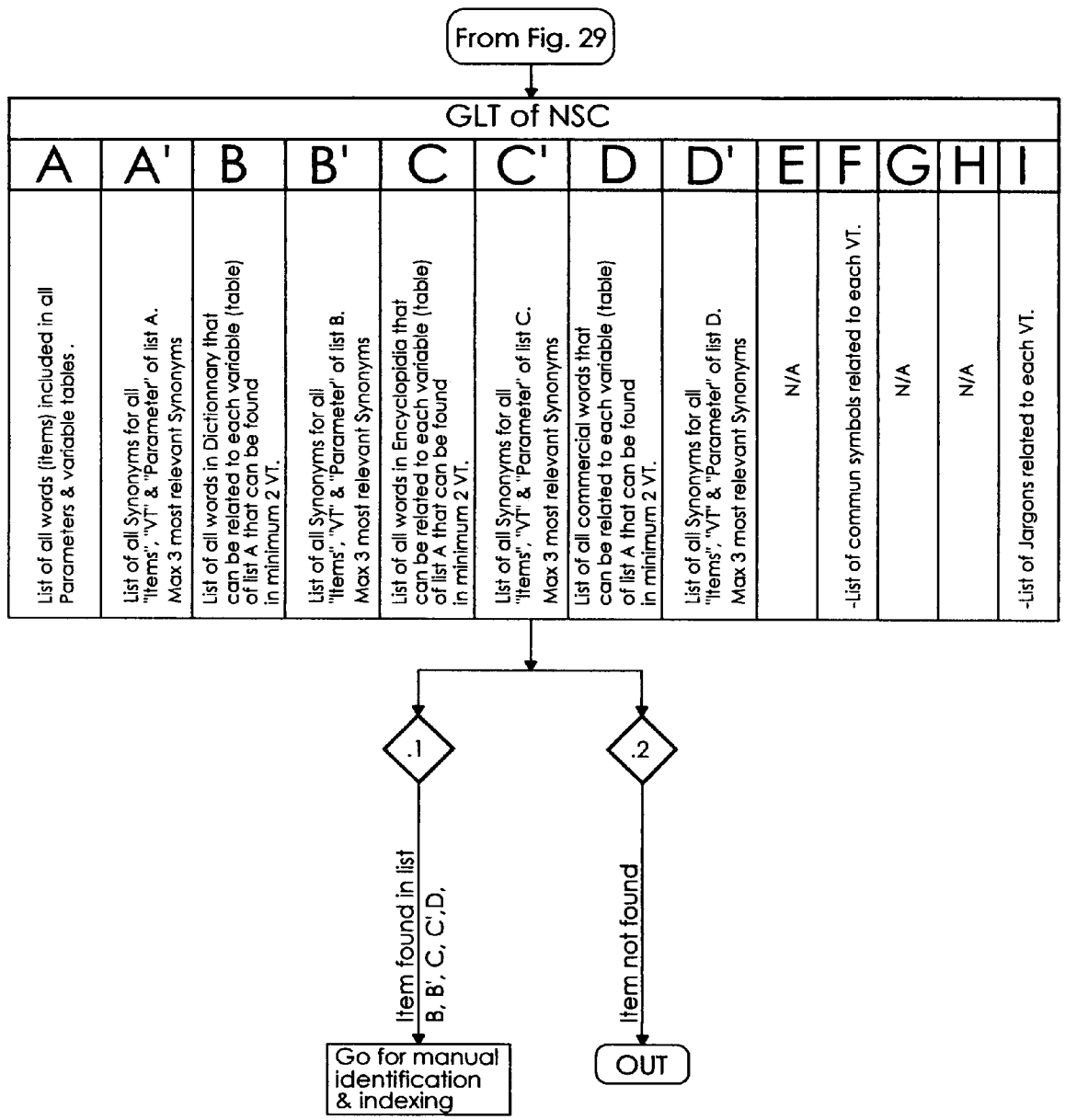
FIG. 32 is a table that describes the contents of the General Library Table.

The system first takes the Q+O typed by the user and passes it through the library of all question forms (General Library of Question Forms). If it does not pass, the question goes to General Library Table as shown in FIG. 32. If it is found, it has to pass by the further filtering for the form of the question for a particular subject.

As a result of the above processing, if no unit has been found in the Expert General Library Table or in the Selected General Library Table, then they are abandoned.

Figure 30:
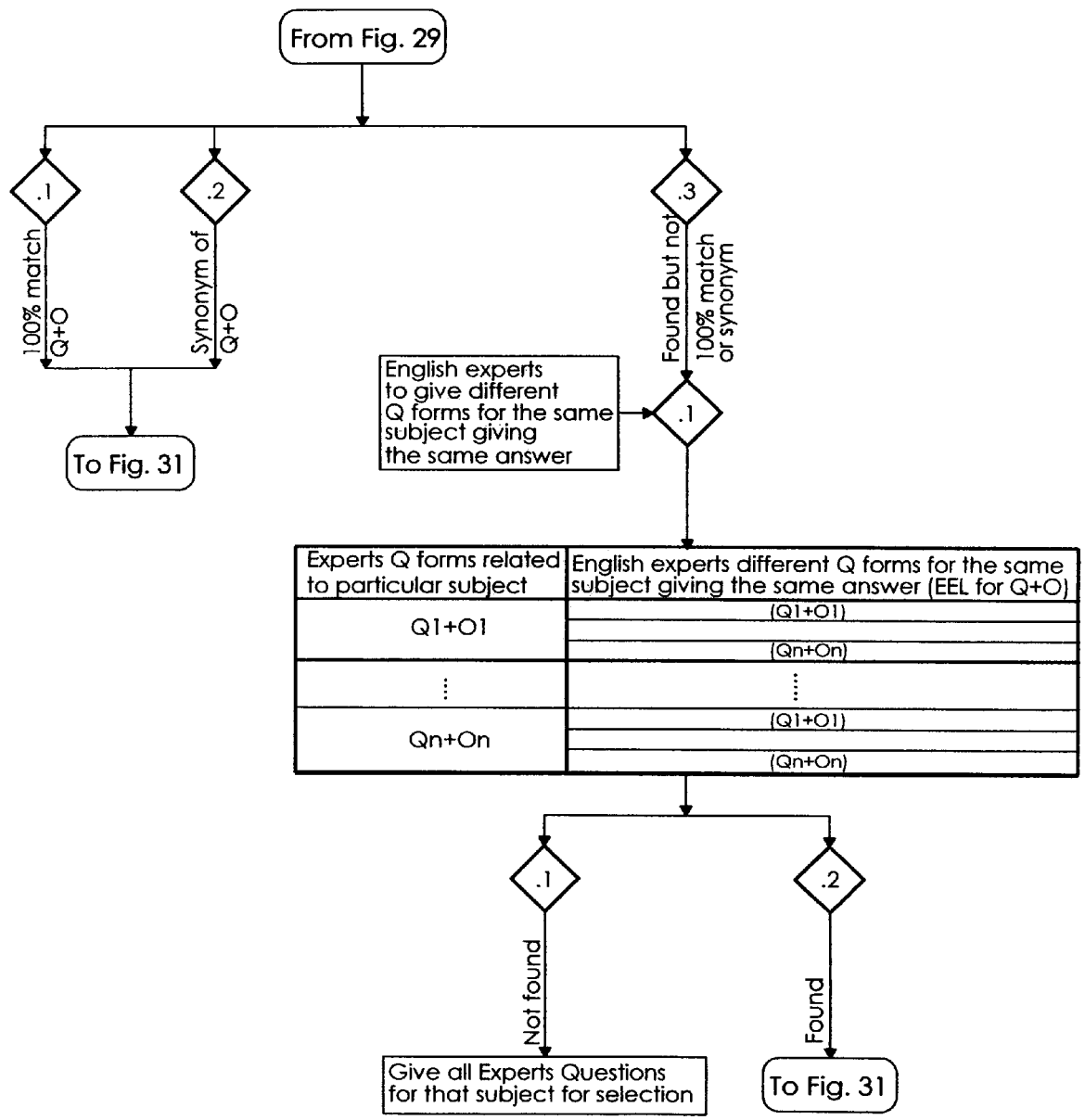
FIG. 30 is the table of all question forms for a particular subject and the English Expert Library Question Forms of FIG. 25.

Referring to FIG. 30, when a subject has been found but the question form is not matched, then one has three possibilities: either one has a 100% match of Q+O, or a synonym of Q+O, or it is found but not with a 100% match or a synonym.

If the system did not find a 100% match or a synonym for that Q+O, the system goes to the list of all question sentences for a particular subject, where a subject is already defined, since one knows from the expert what question goes with a specific or particular subject. To do this, the system goes to an English expert to indicate, of those questions, how one can ask the same question in a different form and still get the same answer.

To do this, the system interrogates a library EEL for Q+O of those types of questions that can be asked in a different way for the particular relation and for the particular answer.

The system selects from the English Expert Library of Q+O, the Q+O typed by the user. If the Q+O is found as seen in FIG. 31 the corresponding answer is given. If it is not found, the system gives all possible questions that the expert gave for the selected subject and their related answers.

This means that, when one asks a question, the question might not match any of the pre-stored forms. However, the subject was matched. So for that subject, the expert has specified certain questions. The system then presents these questions to the user for selection.

Thus, rather than throwing a question out, a proper question for the subject is presented so the user can select one that was close to his original question.

Figure 29:
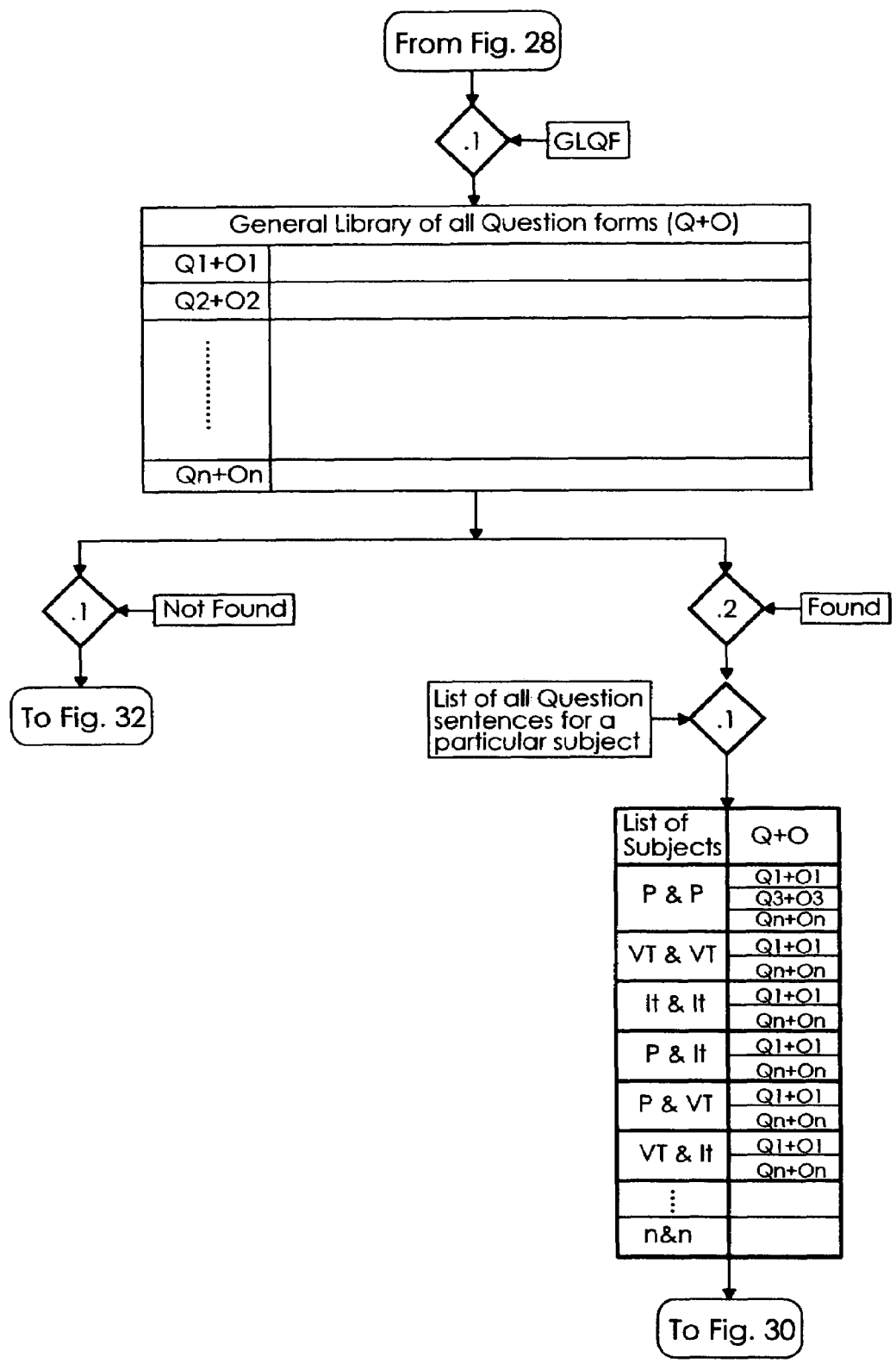
FIG. 29 is a diagrammatic representation of the table of question forms (Q+O)

Now referring to FIG. 32, when the question sentence or the remaining units of the question sentence are not found in the General Library of Question Forms in FIG. 29, then the units pass through the General Library Table. If these units are found in lists B, B', C, C', D, D', then they are sorted manually to upgrade the Selected General Library Table. If the units are not found, then they are abandoned.

Figure 33:
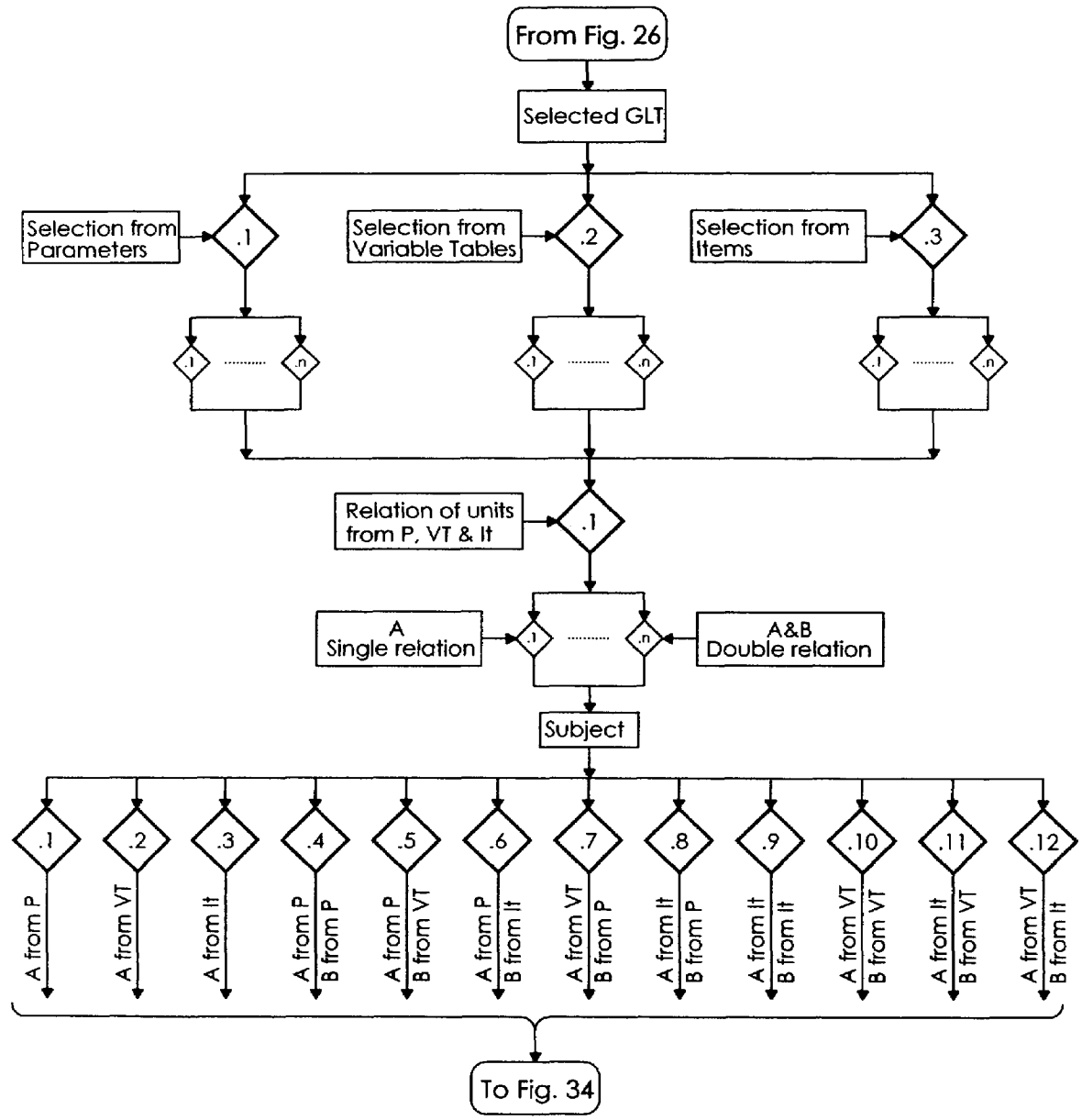
FIG. 33 is a diagrammatic representation of the composing of a fingerprint or electronic query print by selection.

FIG. 33 relates to the case where one is not entering a question by typing. Here there is a selection of parameters generated when one is composing a question sentence related to a product. The items from the Selected General Library Table are presented to the user for him to select either one word A or two words A and B to define a relation that will be the subject of his question. So here, instead of typing, there will be many consumers who do not like to type or do know how to type. As shown, the person chooses any parameter or a variable table or an item from the Selected General Library Table and obtains a single or double relation, A and B. All possible combinations for a subject would be as shown in FIG. 33. A from any parameter, A from any VT, A from any IT, for a single relation. A from P and B from P, A from P and B from VT, A from P and B from IT, A from VT and B from P, A from IT and B from P, A from IT and B from IT, A from VT and B from VT, A from IT and B from VT, A From VT and B from IT, for a double relation.

Here it is the user who specifies the subject without having to analyze a question sentence that has been typed in.

Figure 34:
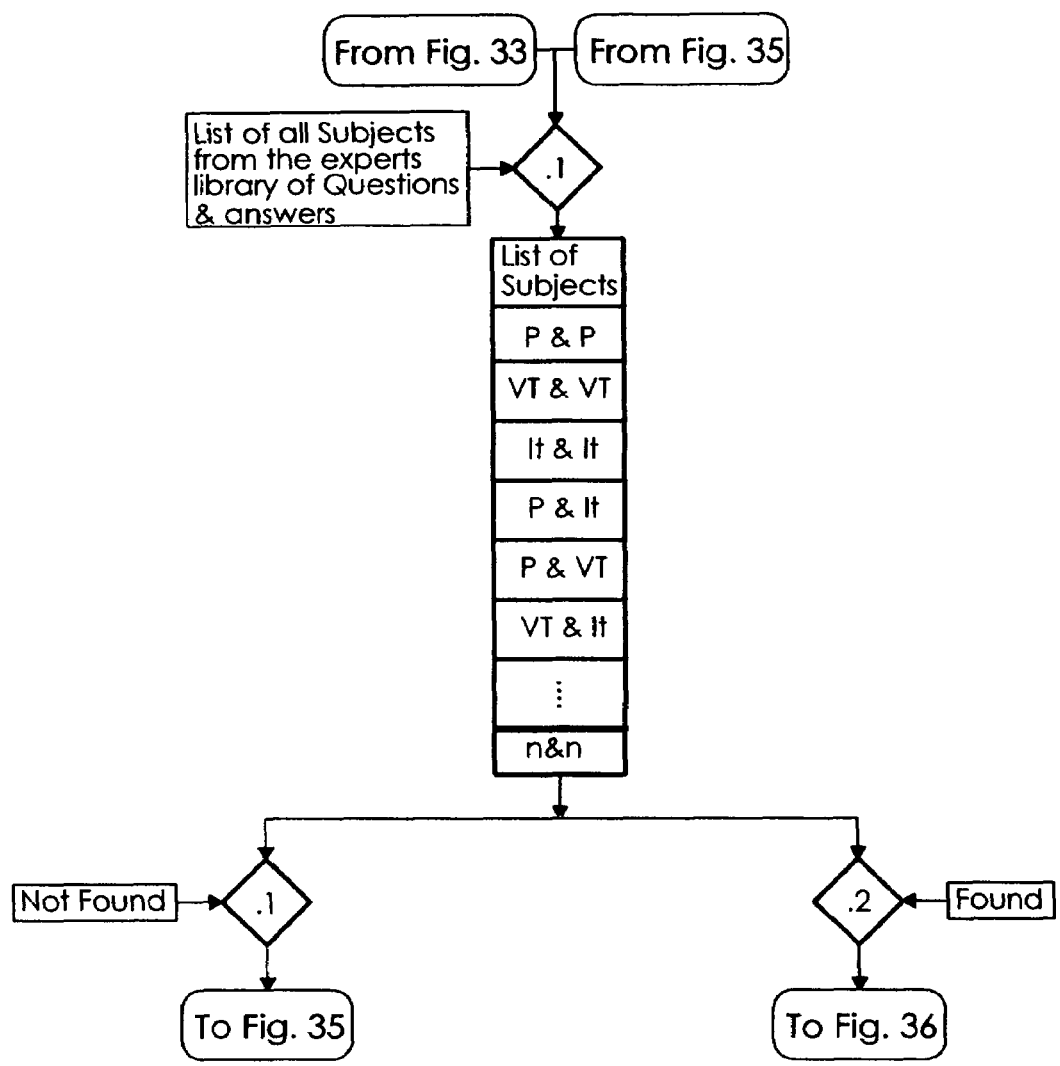
FIG. 34 is a diagrammatic representation of further filtration.
Figure 35:
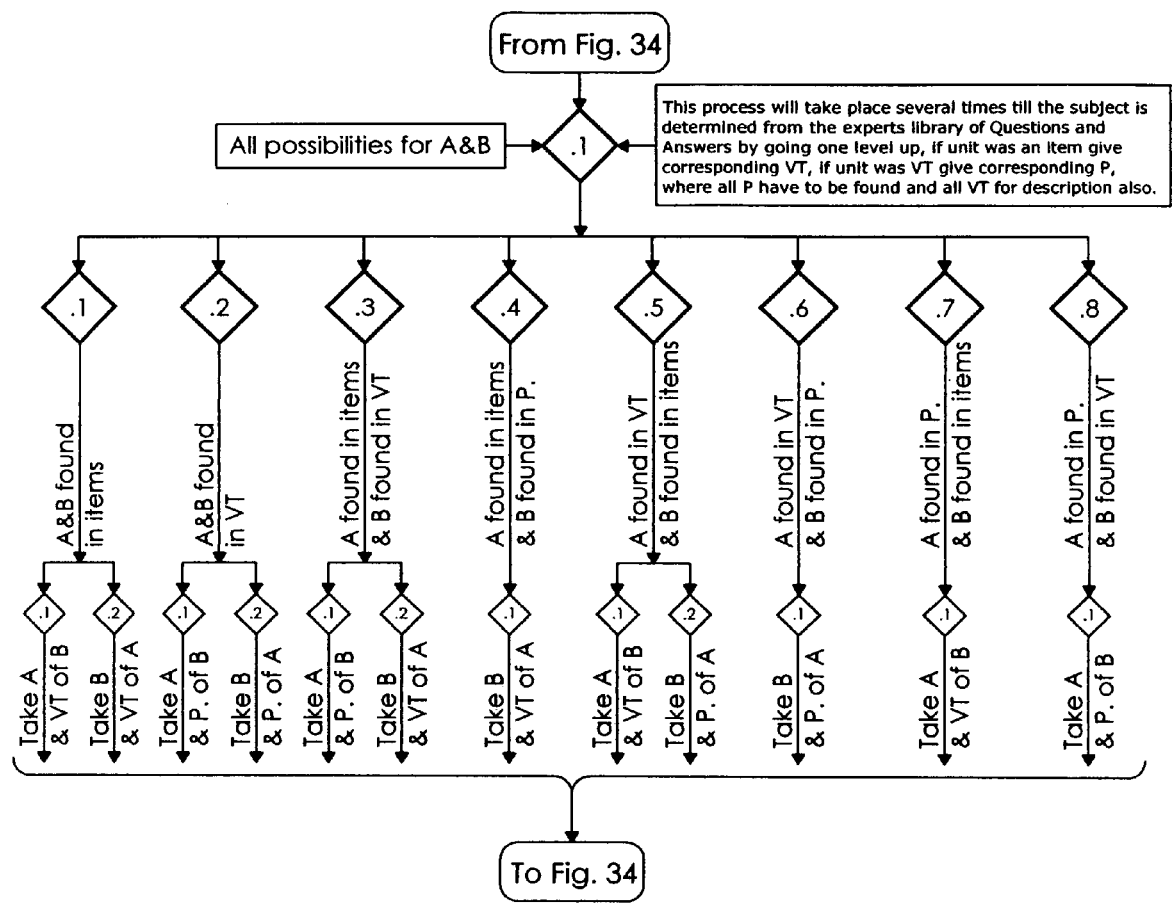
FIG. 35 is a diagrammatic representation of a detail of the further filtration of FIG. 34.
Figure 36:
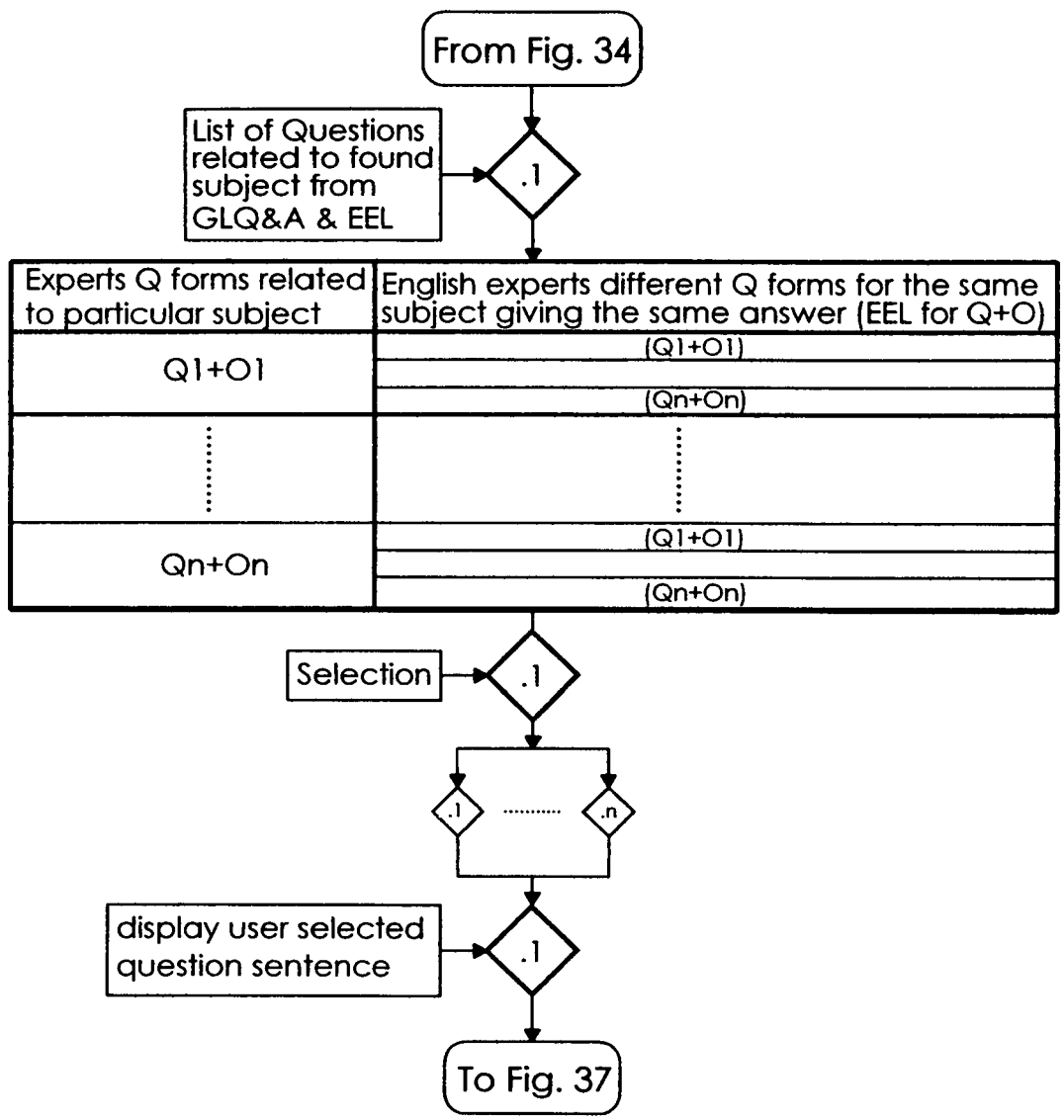
FIG. 36 is a diagrammatic representation of all questions related to subjects A and B, also based on the FIG. 30 Expert List of All Questions for a particular subject; and, FIG. 37 is a diagrammatic representation of Expert Question and Answers.

As shown in FIG. 34, the selected items are passed through a list of all subjects from the Expert Library of Questions and Answers. If it is found, then as shown in FIG. 36 the system displays all question forms related to the found or matched subject, so as the user will be able to select which question he would like to ask for that selected subject. Doing so, the system displays the user's selected question sentence. As can be seen from FIG. 35, it is possible to provide further filtration in several cycles until a subject is determined which can be found in Expert List of Questions and Answers.

Figure 37:
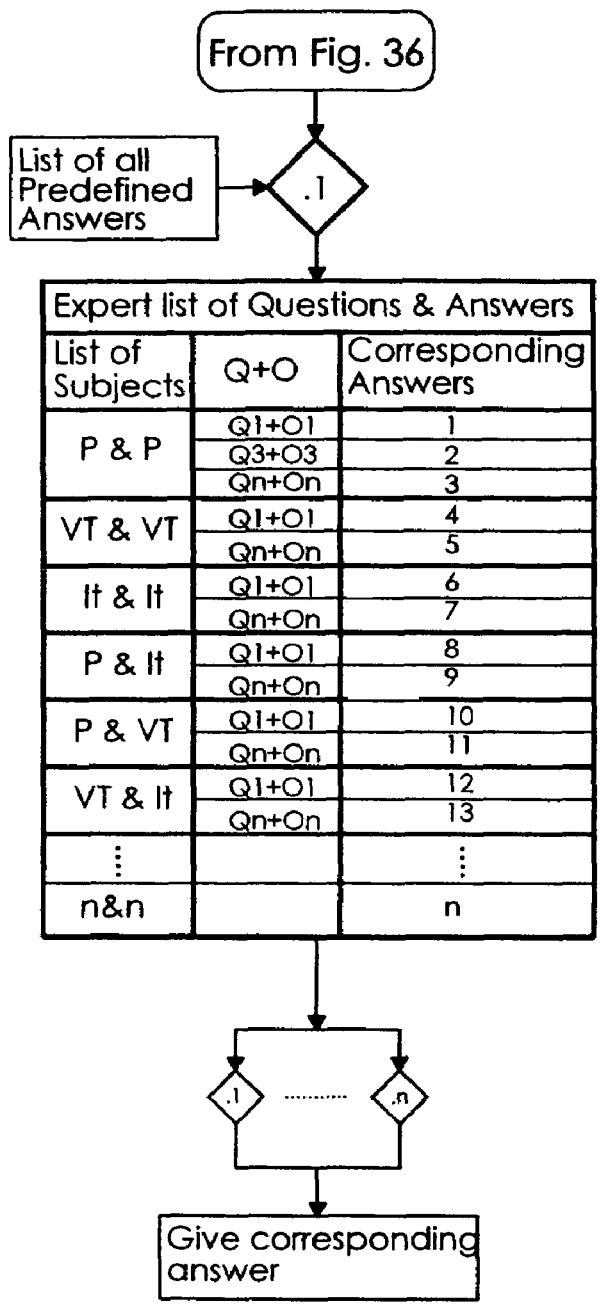

FIG. 37 relates to the answers given to the user's question sentence from the Expert List of Questions and Answers. Note by selection the user is able to see all possible subject relations that could exist in buying a product and makes question recognition and answering faster, with the user being more aware of factors relating to his purchase.

In summary, the subject system uses a neutral expert both to populate all of the libraries and to provide neutral advice to the user. Instead of the user scrolling through the results of the traditional search in which an expert has given pro forma answers to pro forma questions, the subject system recognizes the question automatically and scrolls to the most logical, concise and relevant answers. As a result, one does not have to scroll through 50,000 answers about a product. The Neutral Sales Consultant does it for him by understanding the user's question and automatically scrolling through all of the libraries to provide a better result than the user himself can provide.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for giving a user information about a category of product or service in which the user initially submits a query in the form of a question sentence using a fingerprint query system, comprising the steps of:

during setup, creating libraries constituting contextual relation tables including a General Library of Question Forms, and a General Library of Subjects of Questions organized based upon fingerprint parameters, their values and their relationships, the library set up by an expert who selects the values based on relationships between the values and populates the answers in the Library of Subjects of Questions, whereby subjects can be analyzed on a contextual basis based on parameters, the values thereof and relations between the values to arrive at a verified subject;

during runtime, providing an analyzing engine that analyzes the question sentence to ascertain context by dividing the question sentence into a subject of the question sentence and the form of the question sentence, the analyzing engine analyzing the subject of the question sentence utilizing the Library of Subjects of Questions to arrive at a verified subject, the analyzing engine analyzing the form of the question sentence using the verified subject by matching the detected question form with question forms in the General Library of Question Forms;

upon a question form match for a verified subject accessing a Neutral Consultant Library set up by an expert to provide a predetermined answer to the question;

wherein the libraries include a General Library having a set of General Library Tables that reflect all possible items related to a predetermined category and that are organized into lists;

further including the step of forming a relationship matrix of all words that constitute parameters, variable table entries and items in libraries in which the relationship matrix defines the relationship between two units taken from the group consisting of parameters, variable table entries and items constituting a basket;

submitting the basket to experts to ascertain which of the relationships correspond to real world relationships as they relate to a category, thus to constitute expert verified relationships; and populating an Expert General Library Table from the expert verified relationships, thus to decide from the relationship matrices which relationships exist as determined by experts and thus what questions cart be asked about a specific relationship.

2. The method of claim 1, wherein the libraries include the General Library of Subjects of Questions for the recognition of subjects of a question through the setup of General Library Tables populated using fingerprint parameters.

3. The method of claim 2, wherein the General Library Tables are subdivided into a number of lists.

4. The method of claim 3, wherein only a selected limited number of lists are consulted to determine the subject matter of the question sentence.

5. The method of claim 3, wherein the selected limited number of lists include words, their synonyms, corresponding symbols and corresponding jargon.

6. The method of claim 3, wherein the General Library Table lists are filtered into a Selected General Library Table based on relationships between items in the lists specified by experts so as to make available only lists that make sense in terms of expert-defined relationships so that corresponding libraries can be readily accessed by a user's question sentence.

7. The method of claim 1, wherein the libraries are set up using specialized parameters formulated for fingerprint inquiries relating to the purchasing of an item or service.

8. The method of claim 1, and further including the steps of experts deciding from the questions that can be asked about a subject what relationships make sense, what are the most likely questions issuing from those relationships that make sense and what the corresponding answers should be; and forming a List of Experts' Questions and a List of Experts' Answers therefrom.

9. The method of claim 8, and further including the steps of generating an Alternative List of Experts' Questions and Experts' Answers populated by a number of ways a given question can be asked and still obtain the same answer; and forming an English Expert Library therefrom.

10. The method of claim 9, wherein during runtime a user's question sentence interrogates the Experts' General Library table to establish a match and thus units that are recognized as being part of a subject.

11. The method of claim 10, wherein any remaining unmatched units interrogate the Selected General Library Table to determine if there are more units that are subjects.

12. The method of claim 10, and further including the step of ascertaining the subject of a question sentence if the question sentence is of an expert-recognized form by interrogating the General Library of Question Forms, with a match indicating a legitimate question and a legitimate subject.

13. The method of claim 12, wherein the step of generating an answer to a question includes the step of submitting the legitimate subject having a legitimate form to the List of Experts' Answers.

14. The method of claim 12, and further including the steps of providing the user with all questions that relate to an already identified subject if no legitimate question form is matched by the question sentence; and, having the user select from all of the questions what question is to be answered.

* * * * *